US010453351B2

United States Patent
Choi et al.

(10) Patent No.: US 10,453,351 B2
(45) Date of Patent: Oct. 22, 2019

(54) SYSTEM AND METHOD FOR DETECTING OBSTACLES IN AERIAL SYSTEMS

(71) Applicant: Aurora Flight Sciences Corporation, Manassas, VA (US)

(72) Inventors: Jae-Woo Choi, Manassas, VA (US); Jeffrey Saunders, Manassas, VA (US); James D. Paduano, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 161 days.

(21) Appl. No.: 15/651,512

(22) Filed: Jul. 17, 2017

(65) Prior Publication Data

US 2019/0019423 A1    Jan. 17, 2019

(51) Int. Cl.
| | |
|---|---|
| *G08G 5/04* | (2006.01) |
| *G01S 13/86* | (2006.01) |
| *G01S 13/93* | (2006.01) |
| *G05D 1/10* | (2006.01) |
| *G05D 1/00* | (2006.01) |
| *G08G 5/00* | (2006.01) |
| *G01S 13/72* | (2006.01) |

(52) U.S. Cl.
CPC ............ *G08G 5/045* (2013.01); *G01S 13/867* (2013.01); *G01S 13/9303* (2013.01); *G05D 1/0088* (2013.01); *G05D 1/101* (2013.01); *G08G 5/0039* (2013.01); *G08G 5/04* (2013.01); *G01S 13/723* (2013.01)

(58) Field of Classification Search
CPC ........... G01S 13/93; G01S 13/86; G08G 5/04; G05D 1/10

USPC .............................................. 701/3, 300, 301
See application file for complete search history.

(56) References Cited

U.S. PATENT DOCUMENTS

| | | | |
|---|---|---|---|
| 4,063,073 A | 12/1977 | Strayer | |
| 5,157,615 A | 10/1992 | Brodegard et al. | |
| 5,283,643 A | 2/1994 | Fujimoto | |
| 5,945,926 A * | 8/1999 | Ammar | F41G 7/2226 340/970 |
| 6,480,152 B2 | 11/2002 | Lin et al. | |
| 6,604,044 B1 | 8/2003 | Kirk | |

(Continued)

FOREIGN PATENT DOCUMENTS

| | | |
|---|---|---|
| EP | 2251851 | 11/2010 |
| WO | WO 2016/035002 | 3/2016 |

OTHER PUBLICATIONS

Extended European Search Report, dated Dec. 13, 2018, in European application No. 18183666.9.

(Continued)

*Primary Examiner* — Tan Q Nguyen
(74) *Attorney, Agent, or Firm* — Michael Stanley Tomsa; McAndrews, Held & Malloy, Ltd.; Eugene H. Nahm

(57) ABSTRACT

An automated detection and avoidance system that provides a pilot with high-fidelity knowledge of the aircraft's physical state, and notifies the pilot of any deviations in expected state based on predictive models. The automated detection and avoidance system may include a processor and a sensor payload operatively coupled to the processor to detect a non-cooperative obstacle within a first airspace adjacent the aircraft. The sensor payload may comprise a radar to radially scan the first airspace, and a camera to scan a second airspace within said first airspace.

21 Claims, 19 Drawing Sheets

(56) References Cited

U.S. PATENT DOCUMENTS

| | | | |
|---|---|---|---|
| 6,820,006 B2 | 11/2004 | Patera | |
| 6,993,420 B2 | 1/2006 | Le Draoullec et al. | |
| 7,106,219 B2 | 9/2006 | Pearce | |
| 7,176,830 B2 | 2/2007 | Horibe | |
| 7,193,729 B1 | 3/2007 | Li | |
| 7,203,630 B2 | 4/2007 | Kolb et al. | |
| 7,437,220 B2 | 10/2008 | Stefani | |
| 7,624,943 B2 | 12/2009 | Cerchie et al. | |
| 7,650,232 B1 | 1/2010 | Paielli | |
| 7,784,741 B2 | 8/2010 | Cerchie et al. | |
| 7,848,698 B2 | 12/2010 | Batcheller et al. | |
| 7,954,965 B1 | 6/2011 | Boyd et al. | |
| 8,026,827 B1 | 9/2011 | Boyd et al. | |
| 8,049,658 B1 | 11/2011 | Lagonik et al. | |
| 8,052,096 B2 | 11/2011 | Cerchie et al. | |
| 8,290,638 B2 | 10/2012 | Eicke et al. | |
| 8,306,672 B2 | 11/2012 | Nickolaou | |
| 8,319,665 B2 | 11/2012 | Weinmann et al. | |
| 8,319,666 B2 | 11/2012 | Weinmann et al. | |
| 8,346,480 B2 | 1/2013 | Trepagnier et al. | |
| 8,373,751 B2 | 2/2013 | Han et al. | |
| 8,411,145 B2 | 4/2013 | Fardi | |
| 8,466,827 B2 | 6/2013 | Nanami | |
| 8,504,223 B2 | 8/2013 | Boorman et al. | |
| 8,616,883 B2 | 12/2013 | Wokurka | |
| 8,616,884 B1 | 12/2013 | Lechner et al. | |
| 8,768,534 B2 | 7/2014 | Lentz | |
| 9,052,393 B2 | 6/2015 | Kriel et al. | |
| 9,097,801 B2 | 8/2015 | Kambe et al. | |
| 9,202,098 B2 | 12/2015 | Lewis et al. | |
| 9,417,325 B1* | 8/2016 | Bry | G01S 13/9303 |
| 9,507,021 B2 | 11/2016 | Lynam | |
| 9,847,031 B2* | 12/2017 | Agarwal | G08G 5/0039 |
| 9,939,526 B2* | 4/2018 | Jinkins | G01S 13/953 |
| 10,139,493 B1* | 11/2018 | Chamberlain | G01S 17/933 |
| 2002/0004695 A1 | 1/2002 | Glenn et al. | |
| 2005/0151025 A1 | 7/2005 | Mendelson et al. | |
| 2006/0158350 A1* | 7/2006 | Glover | G01C 21/005 340/963 |
| 2007/0236366 A1 | 10/2007 | Gur et al. | |
| 2008/0316010 A1 | 12/2008 | Chang | |
| 2009/0198392 A1 | 8/2009 | Eicke et al. | |
| 2009/0295602 A1 | 12/2009 | Cernasov et al. | |
| 2011/0149067 A1 | 6/2011 | Lewis et al. | |
| 2011/0160950 A1 | 6/2011 | Naderhirn et al. | |
| 2011/0171611 A1 | 7/2011 | Batcheller et al. | |
| 2011/0288773 A1 | 11/2011 | Hoy | |
| 2014/0080099 A1 | 3/2014 | Sowadski et al. | |
| 2014/0210648 A1 | 7/2014 | Samuthirapandian et al. | |
| 2015/0094982 A1 | 4/2015 | Dupont De Dinechin | |
| 2015/0269847 A1* | 9/2015 | Knight | G01S 13/93 701/3 |
| 2015/0323932 A1 | 11/2015 | Paduano et al. | |
| 2015/0339929 A1 | 11/2015 | Hedrick et al. | |
| 2015/0355318 A1* | 12/2015 | Durand | G01S 13/02 342/5 |
| 2016/0019793 A1 | 1/2016 | Fournier et al. | |
| 2016/0124429 A1 | 5/2016 | Schultz | |
| 2016/0264254 A1 | 9/2016 | Jajur et al. | |
| 2016/0275802 A1 | 9/2016 | Loegering | |
| 2017/0084183 A1 | 3/2017 | Knox | |
| 2017/0267331 A1 | 9/2017 | Schultz | |
| 2018/0033318 A1* | 2/2018 | Yeh | G08G 5/0008 |

OTHER PUBLICATIONS

Aurora Flight Sciences; Centaur Optionally-Piloted Aircraft brochure.

Day, Carole; Your (robot) captain speaking; The Australian Financial Review; Aug. 20, 2016.

Jeong, Heejin, et al.; A Robot-Machine Interface for Full-functionality Automation using a Humanoid; 2014 IEEE/RSJ International Conference on Intelligent Robots and Systems (IROS 2014); Sep. 14-18, 2014, Chicago, IL.

Markoff, John; A Machine in the Co-Pilot's Seat; The New York Times; Jul. 20, 2015.

International Search Report and Written Opinion, dated Jun. 21, 2017, in International application No. PCT/US2017/023523, filed Mar. 22, 2017.

The partial European search report in European application No. 18184925.8, dated Jan. 30, 2019.

Szondy, David: "DARPA robot lands (simulated) Boeing 737" (May 18, 2017), XP002787446, https://newatlas.com/darpa-robot-boeing-737-landing-simulator/49580/ [retrieved on Dec. 14, 2018].

Aurora Flight Sciences: "Robotic Co-Pilot Flies and Lands a Simulated Boeing 737" (May 16, 2017), XP054978975, https://www.youtube.com/watch?v=om18cOWFL3Q [retrieved on Dec. 14, 2018].

Aurora: "ALIAS Advanced Automation to Enable Reduced Crew Operations Aircrew Labor In-Cockpit Automation System Artist's Concept", (Oct. 15, 2016), XP055534900, http://www.aurora.aero/wp-content/uploads/2016/10/ALIAS-Brochure_X8.pdf [retrieved on Dec. 14, 2018].

"AI Just "Landed" a Boeing 737 for the First Time by Itself" (Jun. 28, 2017) https://bigthink.com/robby-berman/ai-just-landed-a-boeing-737-for-the-first-time-by-itself [retrieved on Dec. 3, 2018].

"Answer: Fly your plane; Question: Who or what is CARNAC?" (Jun. 22, 2017), https://www.therobotreport.com/answer-fly-your-plane-question-who-or-what-is-carnac,/ [retrieved on Dec. 3, 2018].

"Inside Darpa's Plan to Make Old Aircraft Autonomous With Robot Arms" (Feb. 11, 2016), https://www.wired.com/2016/11/darpa-alias-autonomous-aircraft-aurora-sikorsky/ [retrieved on Dec. 3, 2018].

"Pilotless planes may be landing at airports by 2020" (Dec. 6, 2016), https://www.geo.tv/latest/122825-Pilotless-planes-may-be-landing-at-airports-by-2020 [retrieved on Dec. 3, 2018].

""Siri, Land the Plane"" (May 26, 2017), https://www.airspacemag.com/daily-planet/meet-your-new-copilot-robotic-arm-180963469/ [retrieved on Dec. 3, 2018].

Extended European search report, in European application No. 18184925.8, dated Apr. 30, 2019.

* cited by examiner

SYSTEM AND METHOD FOR DETECTING OBSTACLES IN AERIAL SYSTEMS

TECHNICAL FIELD

The present invention relates to the field of flight control systems, methods, and apparatuses; even more particularly, to a system, method, and apparatus for detecting and automatically navigating around stationary and/or moving obstacles.

BACKGROUND

Aircraft technology, including unmanned aerial vehicle ("UAV") technology, is a valuable tool for mission profiles involving intelligence, surveillance, reconnaissance, and payload delivery. In operation, aircraft may encounter both large and small obstacles within the aircraft's airspace, which may be fixed or moving, and whose position is not known in advance. Traditional forms of obstacle detection and avoidance within an aircraft rely on a pilot to provide the critical duty of looking outside the aircraft in order to make sure that the aircraft is not on a collision course with an obstacle, such as another aircraft. Existing technology for preventing aircraft from colliding with obstacles, including Global Positioning System ("GPS"), are generally inadequate as many obstructions cannot be recognized (or quickly recognized) via a GPS device and, depending on the altitude or terrain, GPS accuracy performance varies widely across environments.

The commercial aviation industry has, however, adopted a Traffic Collision Avoidance System ("TCAS") as a standard to avoid collisions, which allows cooperative aircraft to locate and avoid each other. As can be appreciated, a cooperative aircraft refers to an aircraft able to cooperate with a cooperative sensor. For example, a cooperative aircraft may be equipped with a TCAS (TCAS II or earlier generation), such as a Mode S or a Mode C transponder, ADS-B, or, alternatively, using other emissions and squitter messages such as ADS-B. While TCAS offers a solution to the problem of detection and avoidance of obstructions for UAVs, TCAS is only able to accomplish this goal if each UAV and obstacle contains a transponder. In other words, cooperative targets send out its location and heading (e.g., GPS location and velocity vector) to other aircraft via radio (e.g., using ADS-B or other methods), whereas non-cooperative obstacle do not send location and heading information to others (multi-rotor aircraft, general aircraft, birds, etc.). Additionally, current flight control systems designed to detect and avoid non-cooperative obstructions utilize costly radar arrays to track obstacle obstructions and are generally only used with large scale aircraft.

Thus, a need exists for a system to detect and avoid non-cooperative UAVs, aircrafts, and obstacles, while being accessible to both large and small aircraft at a reasonable price. Additionally, a need exists for an open architecture system that enables quick introduction of new capabilities, increases safety, and propagates functionality—without large expense or recertification. A system to detect and avoid non-cooperative obstacles collision course in an aircraft, such as is disclosed herein, addresses these needs and enables new capabilities to be rapidly introduced with minimal cost or certification burden.

SUMMARY OF THE INVENTION

The present invention is directed flight control systems, methods, and apparatuses; even more particularly, to a system, method, and technique for detecting and automatically navigating around stationary and/or moving obstructions; even more particularly, sensor and vehicle systems, methods, and techniques for detecting and automatically navigating around obstructions. As will be discussed, the automated detection and avoidance system detects and avoids non-cooperative obstacles to provide a significant benefit to a variety of operators in various applications. By way of illustration and without limitation, the automated detection and avoidance system may be employed in smaller autonomous aircraft, where compliance to the TCAS regulations is not economical, possible, or desired, or as an alternative to air-to-air radar arrays on large aircraft in order to detect and avoid non-cooperative obstacles that would go undetected otherwise.

According to a first aspect, an obstacle detection system for use in an aircraft comprises: a sensor payload to detect a non-cooperative obstacle within a first airspace that is adjacent the aircraft, the sensor payload comprising a radar to radially scan the first airspace to generate radar information having a first resolution, and a camera to image a second airspace within said first airspace to generate optical information at a second resolution that is higher than the first resolution; and a processor operatively coupled with the sensor payload, wherein the processor is configured to determine a location of the non-cooperative obstacle and to identify the non-cooperative obstacle as a function of the radar information and the optical information.

In certain aspects, the camera is configured to pan and tilt.

In certain aspects, the camera includes a long wave infrared sensor.

In certain aspects, the camera includes a visible-near infrared electro-optic (EO) sensor.

In certain aspects, the optical information includes at least one of a thermal cross section and an optical cross section.

In certain aspects, the radar information comprises a radar cross section.

In certain aspects, the processor is configured to divide a digital representation of the first airspace into a plurality of radial sectors.

In certain aspects, the second airspace is located within one of said plurality of radial sectors.

In certain aspects, the radar information includes a two-dimensional (2D) location of the non-cooperative obstacle within the first airspace, and the optical information includes an azimuthal location of the non-cooperative obstacle within the second airspace.

In certain aspects, the radar is a mechanically rotating marine radar.

In certain aspects, the radar information includes a two-dimensional (2D) radial map of the first airspace.

In certain aspects, the 2D radial map is divided into a plurality of radial sectors.

In certain aspects, the processor is configured to identify a radial sector that is associated with the non-cooperative obstacle from said plurality of radial sectors that is associated with the non-cooperative obstacle and to instruct the camera to scan said radial sector.

In certain aspects, the processor is configured to generate a predicted flight path for the non-cooperative obstacle based at least in part on the radar information and the optical information.

In certain aspects, the processor is configured to generate an obstacle-avoidance navigational route to avoid a collision with the non-cooperative obstacles based at least in part on the predicted flight path.

In certain aspects, the processor is configured to generate one or more commands to actuate one or more flight controllers to follow the obstacle-avoidance navigational route.

In certain aspects, the aircraft further comprises a human machine interface operatively coupled with the processor to provide an interface between a pilot and the aircraft.

In certain aspects, the human machine interface is configured to enable the pilot to control or communicate with the processor.

In certain aspects, the human machine interface is configured to display one or more parameters of the sensor payload.

In certain aspects, the human machine interface includes a touch screen display.

In certain aspects, the human interface machine is configured to communicate a command between the processor and the pilot via a voice-based system.

In certain aspects, the first airspace provides a 360-degree field of view about the aircraft.

In certain aspects, the 360-degree field resides in a plane that is parallel to a line of flight defined by the aircraft.

According to a second aspect, a method for detecting and avoiding a non-cooperative obstacle during operation of an aircraft comprises: scanning a first airspace using a radar system to generate radar information having a first resolution; imaging a second airspace using a camera to generate optical information at a second resolution that is higher than the first resolution, wherein the second airspace is within said first airspace; tracking the non-cooperative obstacle based at least in part on the radar information and the optical information; generating a predicted flight path based at least in part on the radar information and the optical information; generating an obstacle-avoidance navigational route to avoid the non-cooperative obstacle; and communicating the obstacle-avoidance navigational route to a flight control system of the aircraft.

In certain aspects, the aircraft is configured to execute autonomously the generated obstacle-avoidance navigational route.

In certain aspects, the camera is configured to pan and tilt.

In certain aspects, the camera includes a long wave infrared sensor.

In certain aspects, the method further comprises the step of dividing the first airspace into a plurality of radial sectors using the processor.

In certain aspects, the second airspace is one of said plurality of radial sectors.

In certain aspects, the method further comprises the step of determining an azimuthal location of the non-cooperative obstacle within the second airspace using the camera.

In certain aspects, the radar is a mechanically rotating marine radar.

In certain aspects, the radar information includes a two-dimensional (2D) radial map of the first airspace.

In certain aspects, the 2D radial map is divided into a plurality of radial sectors.

In certain aspects, the method further comprises the step of identifying, via the processor, a radial sector that is associated with the non-cooperative obstacle from said plurality of radial sectors that is associated with the non-cooperative obstacle.

In certain aspects, the method further comprises the step of generating, via the processor, a predicted flight path for the non-cooperative obstacle based at least in part on the data received from the sensor payload.

According to a third aspect, a sensor payload to detect a non-cooperative obstacle within an airspace adjacent the aircraft comprises: a radar to radially scan the airspace to provide a location of the non-cooperative obstacle; a first sensor to detect a thermal signature of the non-cooperative obstacle at the location; a second sensor to image the non-cooperative obstacle at the location; and a processor operatively coupled with each of the radar, the first sensor, and the second sensor, wherein the processor is configured to determine the location of the non-cooperative obstacle using data from the radar and to classify the non-cooperative obstacle at the location using the thermal signature from the first sensor and the image from the second sensor.

In certain aspects, the camera includes a long wave infrared sensor.

In certain aspects, the camera includes a visible-near infrared electro-optic (EO) sensor.

In certain aspects, the radar is a mechanically rotating marine radar.

DESCRIPTION OF THE DRAWINGS

These and other advantages of the present invention may be readily understood with the reference to the following specifications and attached drawings wherein:

FIG. 1b illustrates an example flow of information data between the subsystems of FIG. 1a.

DETAILED DESCRIPTION

Figure 1A:
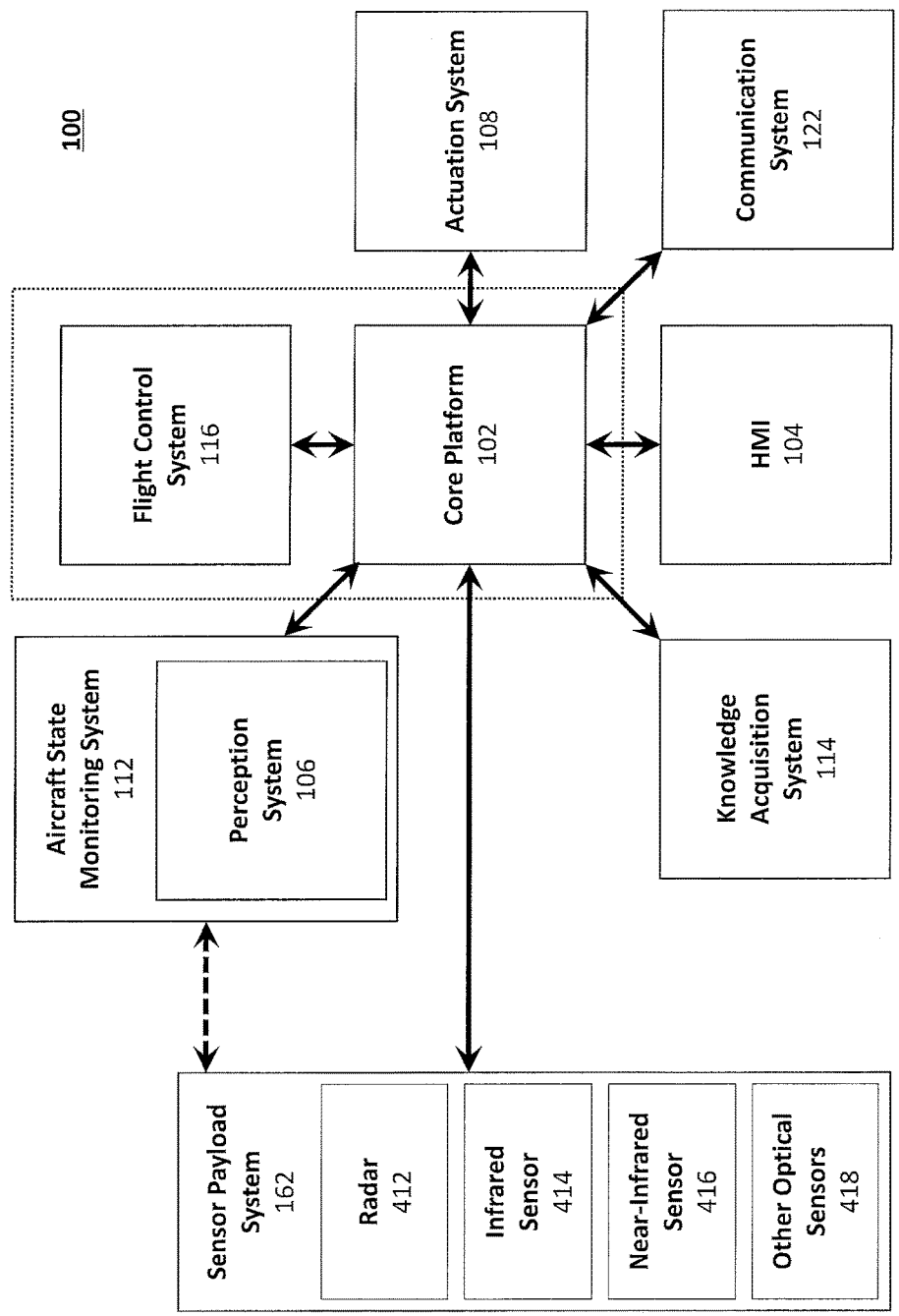
FIG. 1a illustrates a block diagram of an example aircrew automation.

Preferred embodiments of the present invention may be described hereinbelow with reference to the accompanying drawings. In the following description, well-known functions or constructions are not described in detail because they may obscure the invention in unnecessary detail. For this disclosure, the following terms and definitions shall apply.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations.

As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, the terms "aerial vehicle" and "aircraft" refer to a machine capable of flight, including, but not limited to, both traditional runway and vertical takeoff and landing ("VTOL") aircraft, and also including both manned and unmanned aerial vehicles ("UAV"). VTOL aircraft may include fixed-wing aircraft (e.g., Harrier jets), rotorcraft (e.g., helicopters), and/or tilt-rotor/tilt-wing aircraft.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

As used herein, the term "database" means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

As used herein, the term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

Disclosed herein is an automated detection and avoidance system configured to automatically detect and avoid obstacles during operation of an aircraft. The detection and avoidance system may be embodied within virtually any aircraft, including those configured with a pilot, an autopilot, or another automated flight control system. For example, the automated detection and avoidance system may be employed in smaller autonomous aircraft where compliance to the TCAS regulations is not economical, possible, or desired, or as an alternative to air-to-air radar arrays on large aircraft in order to detect and avoid non-cooperative obstacles that would go undetected otherwise.

The automated detection and avoidance system will be generally described in connection with an aircrew automation system, which is configured to function as a pilot's assistant (or co-pilot) or flight engineer. An example aircrew automation system is disclosed by commonly owned U.S. patent application Ser. No. 15/464,786 by Jessica E. Duda et al., filed Mar. 21, 2017, and titled "Aircrew Automation System and Method" (the "786 application").

As explained by the 786 application, an aircrew automation system may be configured to operate an aircraft from takeoff to landing, automatically executing the necessary flight and flight plan activities, checklists, and procedures at the correct phases of flight, while detecting contingencies and responding to them. At the same time, the pilot (e.g., a human pilot or another operator) may be continuously informed through an intuitive human-machine interface operatively coupled with the aircrew automation system. That is, the aircrew automation system may provide real-time information and/or feedback to the pilot. For example, the aircrew automation system may indicate a state of the aircraft relative to the procedure being accomplished. The aircrew automation system may be configured to take control of the aircraft through robotic actuators, if desired.

Unlike existing robotic autopilots and pilot assist systems, which are invasive, require considerable installation expertise, and are aircraft-specific, an aircrew automation system can employ a system architecture and knowledge acquisition system that enables rapid non-invasive installation, which facilitates widespread use and enables the aircrew automation system to be quickly adapted for use in a variety of aircraft. Further, the aircrew automation system's data collection, perception systems, and sensor payload systems are not limited to GPS, accelerations, orientation, and heading, as is the case with existing robotic autopilots. Indeed, the aircrew automation system exceeds the capability of existing data collection and perception systems to better capture aircraft performance by employing both standalone sensors, instrument image data capture (e.g., temperature, altitude, radar, flap angles, etc.), and measuring, detecting, or otherwise receiving pilot inputs. Further, the aircrew automation system's core platform and design of the primary and secondary flight control actuation systems enables portability across a variety of aircraft. Thus, unlike existing robotic autopilots or pilot assist systems, the aircrew automation system may be temporarily installed and readily transferred from aircraft to aircraft, without invasive modification to the aircraft. The aircrew automation system, through its modular design, further reduces the likelihood of designing a single point solution that becomes obsolete as aircraft evolve.

The aircrew automation system's combination of subsystems provides a pilot with high-fidelity knowledge of the aircraft's physical state, and notifies the pilot of any deviations in expected state based on, for example, predictive models. This state awareness may be translated directly into useful information for the pilot, such as alerts to developing emergency conditions, fuel state computation, notification of icing conditions, alert of imminent collision with an obstacle, notification or detected non-cooperative obstacles, etc. For example, the aircrew automation system may also serve as a digital flight engineer, thereby advising the pilot by monitoring checklists, instrumentation, engine state, airspace, flight regime, etc.

This ride-along aircrew automation system, which may be non-invasively installed in preexisting aircraft, perceives the state of the aircraft visually and via other sensors, derives the aircraft state vector and other aircraft information, and communicates any deviations from expected aircraft state to the pilot or an air traffic control tower. While the aircrew automation system may be non-invasively installed (e.g., via a perception system), it may alternatively be invasive. For example, the aircrew automation system may electronically couple with the cockpit instrument panel (e.g., via the reverse side of the instrument panel) via, for example, the aircraft state monitoring system. Alternatively, the aircrew automation system may be integral and permanently installed during fabrication of the aircraft. In conjunction with an actuation system, the aircrew automation system may further take control of the aircraft and autonomously navigate the aircraft. Therefore the various systems and subsystems of the aircrew automation system may be invasive, non-invasive, or a combination thereof.

System Level Architecture.

Figure 1B:
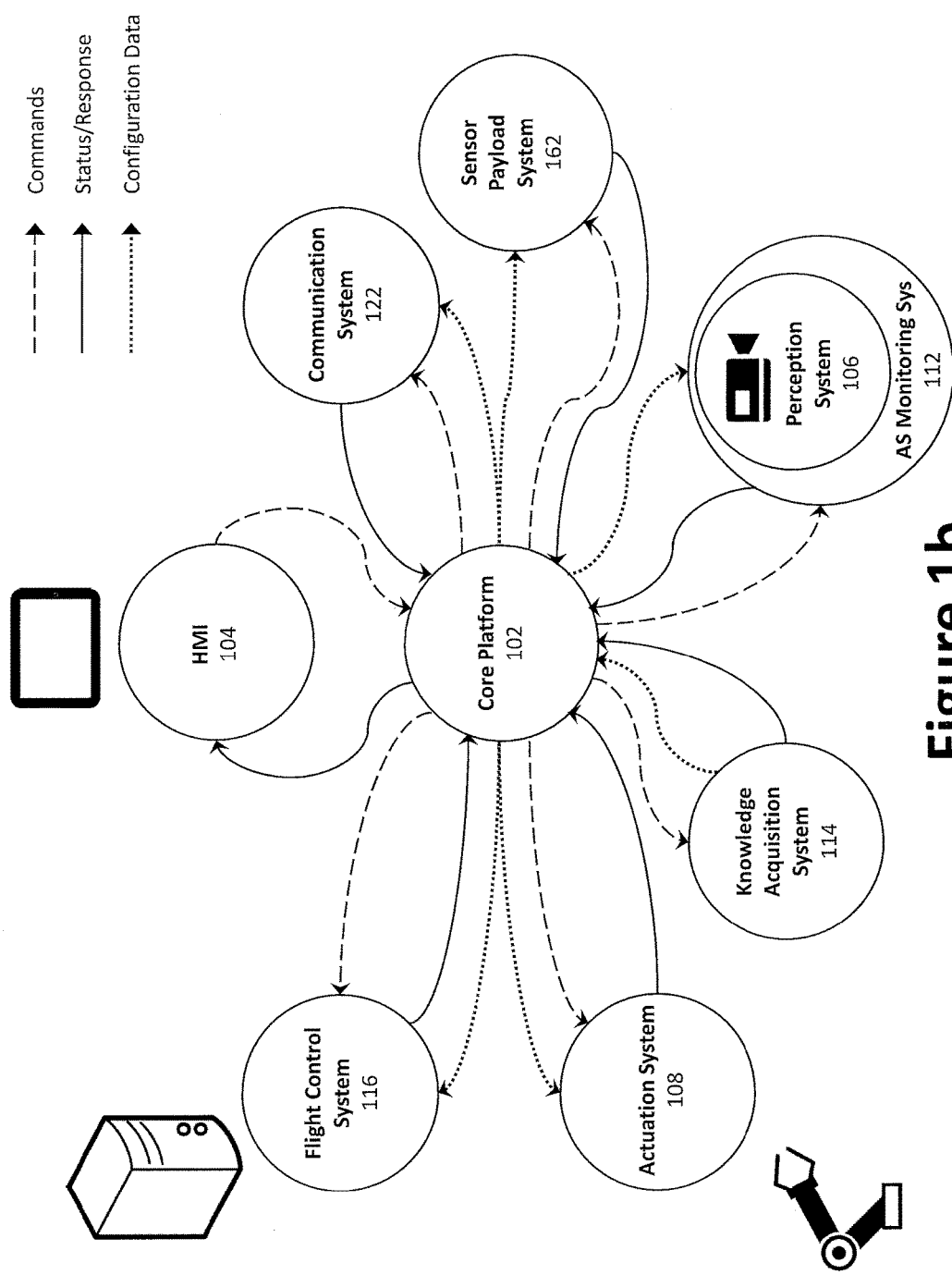
Figure 1C:
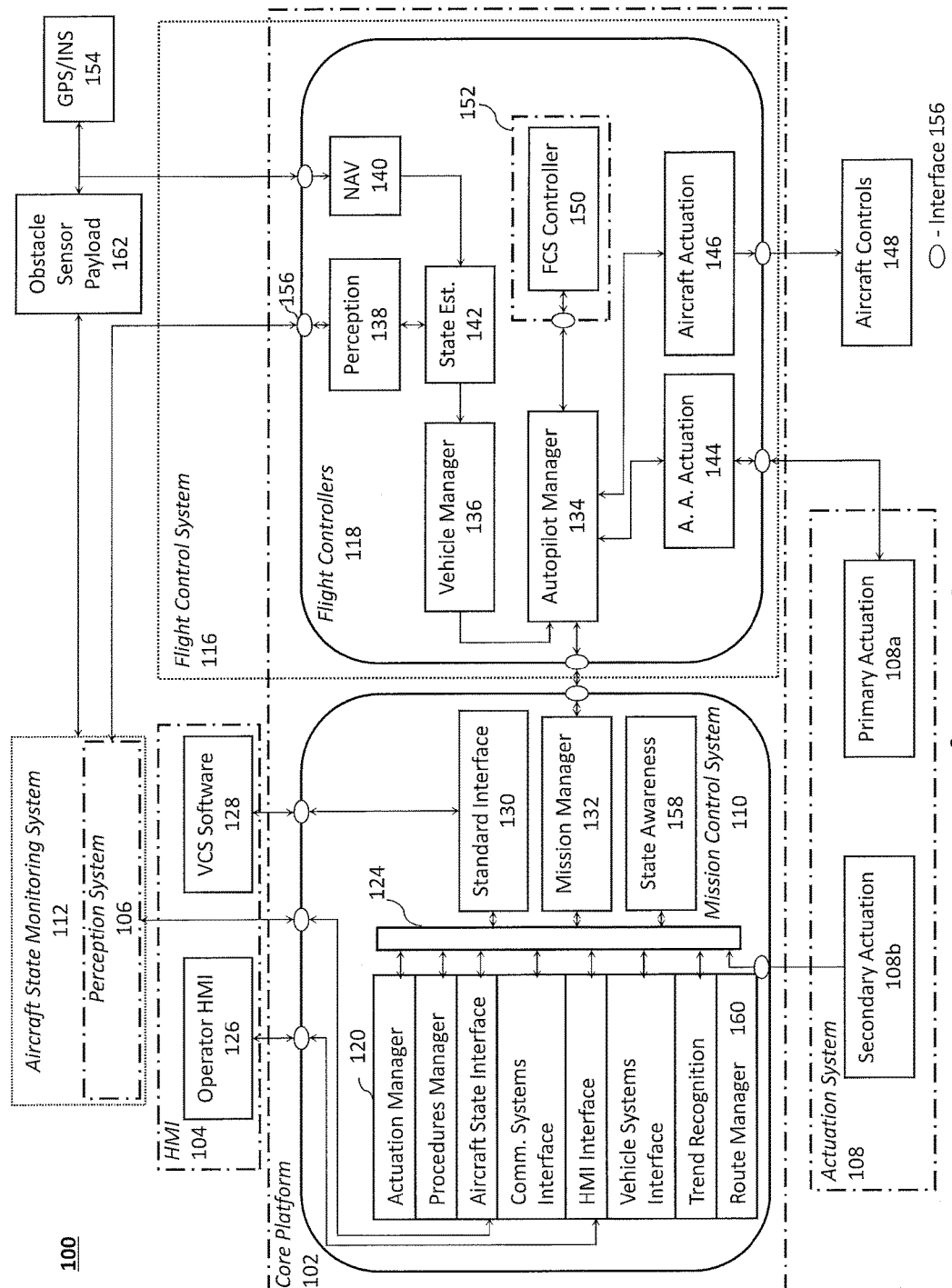
FIG. 1c illustrates a block diagram of an example core platform.

To share the duties and workload related to the execution of flight activities, the aircrew automation system 100 should be capable of executing the actions a pilot would perform routinely over the duration of a flight, regardless of the aircraft make, model, or type. An example system architecture for an aircrew automation system 100 in accordance with one aspect is shown in FIGS. 1a through 1c. As illustrated in FIG. 1a, a processor-controlled central subsystem functions as the core platform 102 to connect one or more other subsystems via one or more interfaces. The subsystems may communicate with one another through software and/or hardware interfaces 156 using wired and/or wireless communication protocols and hardware. FIG. 1b illustrates an example flow of information (e.g., data) between the various subsystems.

Each of the plurality of subsystems of the aircrew automation system 100 may be modular, such that the entire aircrew automation system 100 can be substantially ported to another aircraft rapidly. For example, the various subsystems may be removably and communicatively coupled to one another via the core platform 102 using one or more software and/or hardware interfaces 156. In certain aspects, however, the aircrew automation system 100, or portions thereof, may alternatively be integral with the aircraft's system, thereby directly employing sensors and indicators in the airplane. For example, the aircrew automation system 100, or components thereof, may be integrated into the aircraft during its design and manufacturing.

The plurality of subsystems may include, for example, a perception system 106, an actuation system 108, a human machine interface ("HMI") system 104, a flight control system 116, and an obstacle sensor payload 162, each of which may be operatively coupled with the core platform 102. In certain aspects, the need for a perception system 106 may be mitigated or obviated via use of another aircraft state monitoring system. For example, the aircrew automation system 100 may couple (e.g., communicatively or electronically) with the instrument panel, or be otherwise integrated with the aircraft or its existing systems. As can be expected, however, such integration would likely require a degree of modification to the aircraft or its wiring.

The aircrew automation system 100 and/or core platform 102 may also comprise, or be operatively coupled to, a knowledge acquisition system 114 and a communication system 122. The modular configuration further enables the operator to remove/disable unnecessary systems or modules or to add/install additional systems or modules. For example, when the aircrew automation system 100 is configured to only provide information to the pilot via the HMI system 104 (i.e., without the ability to control the aircraft), the actuation system 108 may be removed or disabled to reduce weight, cost, and/or power consumption. Accordingly, depending on the configuration, the aircrew automation system 100 may be configured with fewer or additional modules, components, or systems without departing from the spirit and scope of the invention.

In operation, the flight control system 116 derives the aircraft state based on information data from another subsystem (e.g., aircraft state monitoring system 112, perception system 106, obstacle sensor payload 162, etc.) and directs another subsystem (e.g., the actuation system 108, flight control system 116, flight control system 116, etc.) to operate (e.g., dynamically) in a manner to maintain aircraft stability. Indeed, the flight control system 116 may receive vehicle mode commands and configuration data from the core platform 102, while sending to the core platform 102 status and command information generated by the flight control system 116. For example, the core platform 102 may be configured to communicate one of more commands to the flight control system 116 of the aircraft based at least in part on the flight situation data, which may be obtained from the aircraft state monitoring system 112, the perception system 106, the obstacle sensor payload 162, and/or a combination thereof.

The flight control system 116 may include, or communicate with, existing flight control devices or systems, such as those employed in fixed wing aircraft and rotary wing aircraft. The communication system 122 enables the aircrew automation system 100 to communicate with other devices (including remote or distant devices) via, for example, a network. The communication system 122 may receive communication commands and configuration data from the core platform 102, while sending to the core platform 102 status and response information from the communication system 122.

Core Platform 102.

Figure 2:
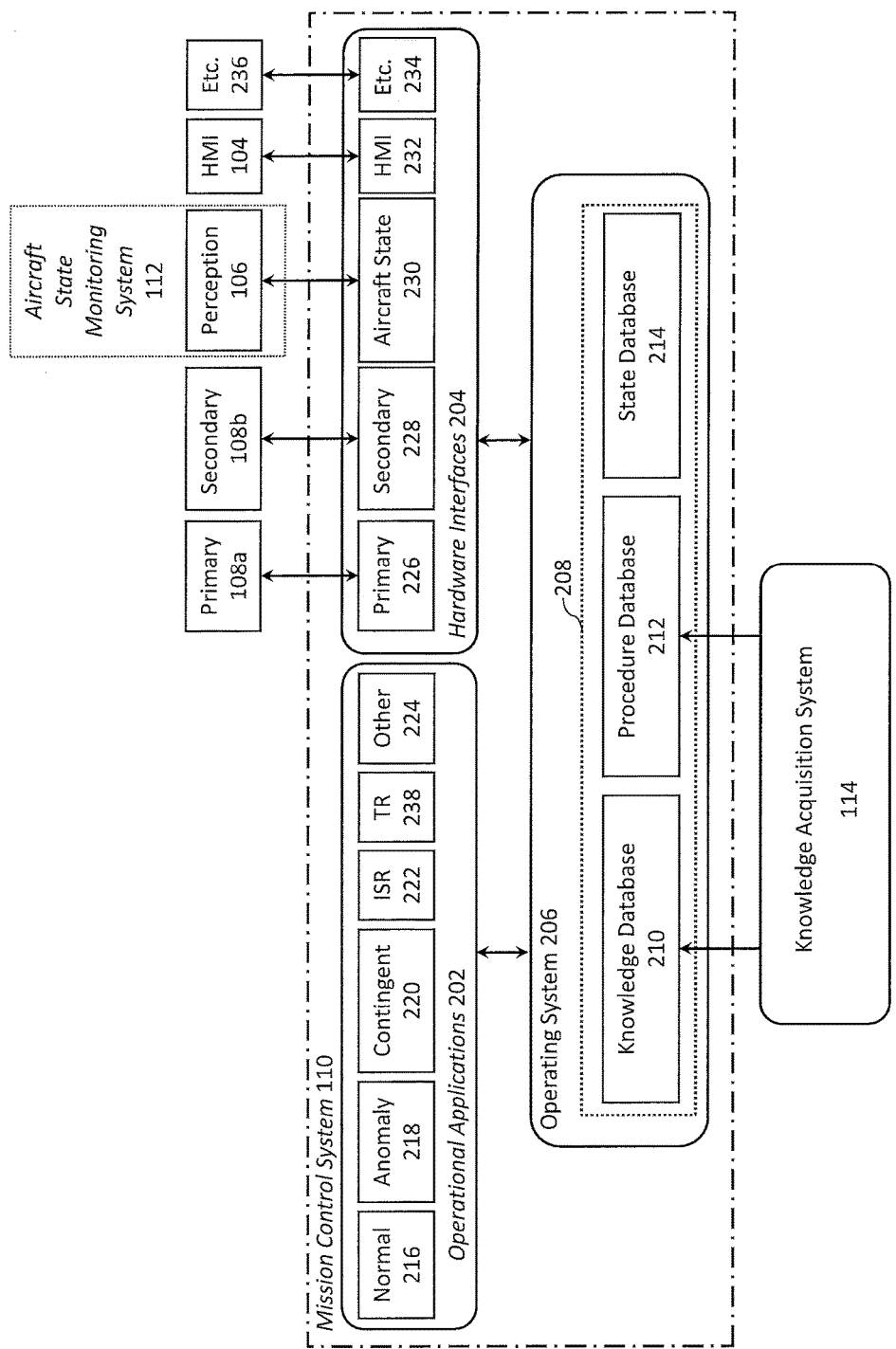
FIG. 2 illustrates a diagram of an example core platform architecture.

FIG. 2 illustrates an architecture diagram of an example core platform 102. To enable a vehicle-agnostic aircrew automation system 100, a core platform 102 may be a processor-based computer system to provide, or otherwise facilitate/serve as, middleware that can be made specific to a particular aircraft or configuration through an initial transition and setup phase. In other words, the mission control system 110 may provide an operating system 206 that provides services to a set of operational applications 202 and output signals to one or more of a set of hardware interfaces 204 or HMI system 104, while collecting and logging the data necessary to enable those applications.

The core platform 102 serves as the primary autonomous agent and decision-maker, which synthesizes inputs from the perception system 106, aircraft state monitoring system 112, obstacle sensor payload 162, and HMI system 104 with its acquired knowledge base to determine the overall aircraft system state. The core platform 102 may process inputs from the various sensor suites and aggregate the resultant information into an understanding of current aircraft state. The resultant information may be compared against an aircraft specific file that encompasses aircrew automation system's 100 understanding of pilot intent, system health, and understanding of appropriate aircraft procedures as they relate to the aircrew automation system's 100 state estimation. The resultant state knowledge and associated recommendations can be passed to a human pilot via the HMI system 104 or, in certain aspects, to the flight control system 116 and/or actuation system 108 to enable autonomous operation. For example, the core platform 102 may communicate information reflecting a detected non-cooperative obstacle on a collision path with the aircraft, which may be detected by the obstacle sensor payload 162, to the flight control system (e.g., the flight control system 116, which may be an existing flight control system of the aircraft) to initiate an obstacle-avoidance navigational route generated by the core platform 102.

The core platform 102 may also contain a flight data recorder, for instance to provide performance review capability and to provide robustness against in-flight reset. The aircrew automation system 100 may further generate a log of a given flight for later analysis, which may be used to facilitate pilot training that can provide detailed training and operations flight debriefs. The logs may be used in connection with, for example, flight operational quality assurance analysis, maintenance analysis, etc.

As illustrated, the core platform 102 may comprise a mission control system 110 and flight controllers 118, each of which are configured to communicate with one another and the other subsystems via one or more software and/or hardware interfaces 156, which may be a combination of hardware (e.g., permanent or removable connectors) and software. The core platform 102 can host various software processes stored to a memory device that tracks the aircraft, cooperative obstacles, non-cooperative obstacles, and procedure states, as well as any modules for trend analytics (predictive warnings) and machine-learning routines. In certain aspects, the aircrew automation system 100 and/or core platform 102 may employ a computer bus and specification (e.g., as an interface) that facilitates discovery of a hardware component of a subsystem within the aircrew automation system 100 without the need for physical device configuration or user intervention in resolving resource conflicts. Such a configuration may be referred to as "plug and play." Thus, a user may readily add or remove systems or subsystems (e.g., as modules) to the aircrew automation system 100 via the core platform 102 without requiring substantive modification or integration efforts.

An output from the core platform 102 may be used to provide messages to the HMI system 104. The messages may indicate, for example, checklist progress, contingencies to initiate, warnings to raise, the location of non-cooperative obstacles, potential obstacle-avoidance navigational routes, etc. The hardware and various computers may also be ruggedized and share a housing with other devices, such as the perception computer. As discussed below, the core platform 102 may be operatively coupled with a global positioning system ("GPS")/inertial navigation system ("INS") system 154, an obstacle sensor payload 162, and power management system (e.g., 28 VDC power).

The mission control system 110 generally comprises a mission manager 132, a standard interface 130 (e.g., a STANAG interface), a state awareness manager 158, and other operational components 120 (e.g., hardware and software controllers and/or interfaces), each of which are communicatively coupled to one another via one or more data buses 124. For example, one of the operational components 120 may be a route manger 160. The route manger 160 may track both non-cooperative obstacles and cooperative obstacles using data from the obstacle sensor payload 162 to generate a predicted flight path for each of said non-cooperative obstacles and cooperative obstacles. Based at least in part on the predicted flight paths, the route manger 160 may generate an obstacle-avoidance navigational route for the aircraft to avoid, or otherwise mitigate, collision with the non-cooperative and/or cooperative obstacles. In generating the obstacle-avoidance navigational route, the route manger 160 may also take into account terrain and any aircraft constraints, which may be dictated by aircraft configuration (e.g., multirotor aircraft versus fixed wing). For example, a multirotor aircraft can more quickly transition from horizontal flight to hovering flight. Other aircraft constraints may be defined in the operational documentation for a given aircraft.

The open architecture of the core platform 102 enables the incorporation of additional data received from systems via the data bus 124. In certain aspects, the mission control system 110 may be coupled with one or more cockpit instruments of the aircraft via the vehicle systems interface to collect flight situation data. In other aspects, the mission control system 110 may collect flight situation data through an aircraft state interface via the aircraft state monitoring system 112, which may collect or generate flight situation data via a direct connection to the aircraft, the perception system 106, and/or the obstacle sensor payload 162.

As illustrated, the mission control system 110 may be operationally coupled with the secondary actuation system 108b (e.g., when autonomous operation is desired), the perception system 106, obstacle sensor payload 162, and the HMI system 104, including the human-machine interface 126 (e.g., software and/or hardware that conveys inputs from and displays information to the pilot) and ground station 128. The mission control system 110 may communicate with the flight controllers 118 via the mission manager 132.

The flight controllers 118 may include, for example, an autopilot manager 134 and a vehicle manager 136. The vehicle manager 136 may be generally responsible for navigation and determining the location and state of the aircraft. The vehicle manager 136 may be coupled with a state estimation module 142, which determines the estimated state of the aircraft using information received from the perception system 106 via a perception module 138, from the obstacle sensor payload 162, and from the GPS/INS system 154 via a navigation module 140.

The autopilot manager 134 may be generally responsible for controlling the aircraft's flight based on, for example, information received from the vehicle manager 136 and the mission control system 110. The autopilot manager 134 controls, inter alia, the flight control system 152, which may be new or preexisting (and comprises a flight controller 150), as well as the aircrew automation actuation module 144 and the aircraft actuation module 146. The aircrew automation actuation module 144 may control the primary actuation system 108*a*, while the aircraft actuation module 146 may control the aircraft controls 148 (e.g., various flight surfaces and actuators). The autopilot manager 134 may be configured to receive and implement one or more routes from the route manger 160, including the obstacle-avoidance navigational route.

In certain aspects, the flight controller's 118 components may overlap with certain components of the flight control system 116. For example, in certain aspects (e.g., where redundancy is not desired and non-invasive integration is possible), the core platform 102 may exploit certain of the existing aircraft software and/or hardware, thereby obviating the need for additional hardware, such as certain flight controller 118 components and/or a GPS/INS system 154.

Open Architecture.

The core platform 102 serves as the central subsystem, or interface, of the aircrew automation system 100, connecting and controlling the remaining subsystems (e.g., as individual applications) in an open architecture. The remaining subsystems include, for instance, the flight control system 116 (including any flight plan capabilities), the HMI system 104, the actuation systems 108 (e.g., the primary and secondary actuation systems to provide autonomous operation where desired), the perception system 106, knowledge acquisition system 114, the obstacle sensor payload 162, and other subsystems 236. Thus, control of the other aircrew automation system 100 hardware may be provided via separate applications specific to a particular piece of hardware, which enables rapid integration of new systems or other external flight plan support technology.

The core platform's 102 architecture enables rapid portability and extensibility when transitioning to a new aircraft or incorporating a new flight plan feature/capability. Thus, an application may be used to enable the aircrew automation system 100 to acquire information specific, or otherwise needed, for that aircraft or to provide the new capability. For example, transition and setup can be handled by individual applications that operate within the core platform 102 or other subsystems, representing aircraft-specific functionalities as well as a growing library of capabilities of aircrew automation system 100, which can be exchanged depending on flight plan, aircraft or crew requirements. In certain aspects, the transition process may be supported by software applications external to the aircrew automation system 100 (such as a procedure editor).

Aircraft Data Structure 208.

The operating system 206 operates as the middleware, interconnecting the operational applications 202, hardware interfaces 204, and other subsystems, such as the knowledge acquisition system 114. The operating system 206 may employ an aircraft data structure 208, which may include a knowledge database 210, a procedure database 212, and a state database 214.

The aircraft data structure 208 facilitates a vehicle-agnostic aircrew automation system 100 by enabling the core platform 102 to develop a complete understanding of an aircraft's systems, their configuration, and the procedures necessary to maintain safe operation, and all other knowledge and expertise a certified pilot of that aircraft would be expected to have. The aircraft data structure 208 may be populated by the knowledge acquisition system 114 (discussed below), which contains necessary information about the aircraft currently being operated (e.g., flight control model, operational procedures, aircraft systems, etc.), data received from internal state sensors, and other subsystems or sensors (e.g., the obstacle sensor payload 162).

The aircraft data structure 208 can be populated and adjusted to a specific aircraft during a knowledge acquisition phase (e.g., during initial setup) such that it contains all the information necessary to operate the aircraft. For example, when transitioning to a new aircraft, the knowledge acquisition system 114 may perform predefined activities in order to determine the layout (e.g., of the controllers/read outs, such as the cockpit instruments), performance parameters, and other characteristics of the aircraft. The predefined activities may include, for example: (1) generation of an aircraft system model, which informs the aircrew automation system 100 about which systems are onboard and its configuration, actuation limits, etc.; (2) procedure codification, which informs the aircrew automation system 100 how to operate the aircraft in normal and non-normal situations, further including the codification of checklists; (3) an aerodynamic model, which informs the aircrew automation system 100 how to fly the aircraft and what performance to expect for which aircraft configurations; and (4) information about mission operations.

The core platform 102 can combine this information with data from a set of internal state sensors, which also improves redundancy and system robustness, thereby allowing the aircrew automation system 100 to generate a highly accurate estimate of the aircraft state and system statuses, and to identify deviation from expected behavior. During flight operations, the data structure is dynamically updated with real-time data gathered by, inter alia, the aircrew automation system's 100, the perception system 106, the obstacle sensor payload 162, the HMI system 104, as well as the aircrew automation systems 100 internal state sensing. Once the aircraft data structure 208 for a given aircraft is populated, the aircraft data structure 208 can then be retained in an aircraft library and used for all other aircraft of the same make and model for which aircrew automation system 100 is available. The aircraft data structure 208 may be further refined as additional data is generated and/or collected by the aircrew automation system 100.

Operational Applications 202.

The core platform 102 may provide the aircrew automation system 100 with a plurality of operational applications 202. Examples of such operational applications 202 might include, without limitation, normal flight operation application 216, an anomaly detection application 218, a contingency operation application 220, an intelligence, surveillance, and reconnaissance ("ISR") application 222 (e.g., ISR orbits), a trend recognition application 238, or other flight plan-specific activity applications 224, such as an aerial refueling application 316 and/or a sensor payload monitoring application 336.

The normal flight operation application 216 enables the aircrew automation system 100 to fly a predetermined flight plan from takeoff to landing, assuming no contingencies. The normal flight operation application 216 is specific to the continuous execution of normal flight activity, as needed by a particular flight phase. The predetermined flight plan may be modified in flight due to unexpected disturbances such as weather, air traffic control commands, air traffic, etc. For example, a predetermined flight plan may be replaced with an obstacle-avoidance navigational route, or other route, from the route manger 160 based as least in part on sensor data from the obstacle sensor payload 162.

The anomaly detection application 218 employs machine-learning techniques to monitor aircraft state, cluster, and classify sensor inputs in order to detect the presence of non-normal situations, and to identify whether a contingency has occurred. The anomaly detection application 218 is configured to compare the sensed states against a set of thresholds defined in the operational documentation for the specific aircraft (e.g., never exceed a predetermined airspeed, engine temperature, etc.). The anomaly detection application 218 may also compare the sensed states against additional information available to aircrew automation system 100, such as information received from the obstacle sensor payload 162, and generate alerts or other messages in response to meeting predetermined or dynamically determined thresholds (e.g., warning thresholds, etc.).

In case of a contingency condition, a contingency operation application 220 executes the necessary predetermined checklists, procedures, and actions specified by the contingency operation application 220 in order to maintain safe operation of the aircraft or safely divert the flight. Notably, if a departure from expected performance is observed, the pilot can be alerted to a non-normal condition, thereby mitigating or avoiding potential mistakes. If an aircraft is susceptible to a particular operational error (e.g., pilot induced oscillations), the aircrew automation system 100 can identify and mitigate such events. If an anomaly is detected, the contingency operation application 220 informs and interacts with the pilot via the HMI system 104 and ultimately executes the necessary procedure(s) to respond to the anomaly. Finally, the ISR application 222 and other flight plan-specific activity applications 224 may provide instructions, algorithms, or information to carry out operations relevant to a mission.

The trend recognition application 238 provides trend analysis developed using machine-learning based on, for example, the knowledge acquisition system 114. In certain aspects, the trend recognition application 238 may supply data, or otherwise trigger, the anomaly detection application 218. For example, if the trend recognition application 238 detects an undesirable trend, the trend may be flagged as an anomaly and reported to the anomaly detection application 218 (e.g., when a non-cooperative obstacle is detected on a collision course with the aircraft).

Hardware Interfaces 204.

The various information pertaining to the operational applications 202 are communicated between the core platform 102, the primary actuation system 108a, the secondary actuation system 108b, the perception system 106, the obstacle sensor payload 162, the aircraft state monitoring system 112, the HMI system 104, and other subsystems 236 via, for example, the primary actuation interface 226, secondary actuation interface 228, aircraft state interface 230, HMI interface 232, and other interface 234.

Human/Machine Interface (HMI) System 104.

The HMI system 104 provides a control and communication interface for the pilot (e.g., a human pilot, whether on-board or remote). The HMI system 104 is configurable to operate as a flight plan manager that enables the pilot to direct the aircrew automation system 100. The HMI system 104 can combine elements of glass cockpits, unmanned aerial vehicle ("UAV") ground stations, and electronic flight bags ("EFB") to enable effective, efficient and latency-tolerant communication between the pilot and aircrew automation system 100. Generally speaking, an EFB is an electronic information management device that allows flight crews to perform a variety of functions that were traditionally accomplished by using paper references. The HMI system 104 may include a human-machine interface 126, which may be based on a touch screen graphical user interface ("GUI") and/or speech-recognition systems. The human-machine interface 126 may employ, for example, a tablet computer, a laptop computer, a smart phone, or combination thereof. The human-machine interface 126 can be secured near the pilot (e.g., on the yoke—as checklists often are, or on a knee-strap) depending on pilot preferences. The human-machine interface 126 may be removable coupled to the cockpit or, in certain aspect, employ an integrated display within the cockpit (e.g., an existing display).

Figure 3A:
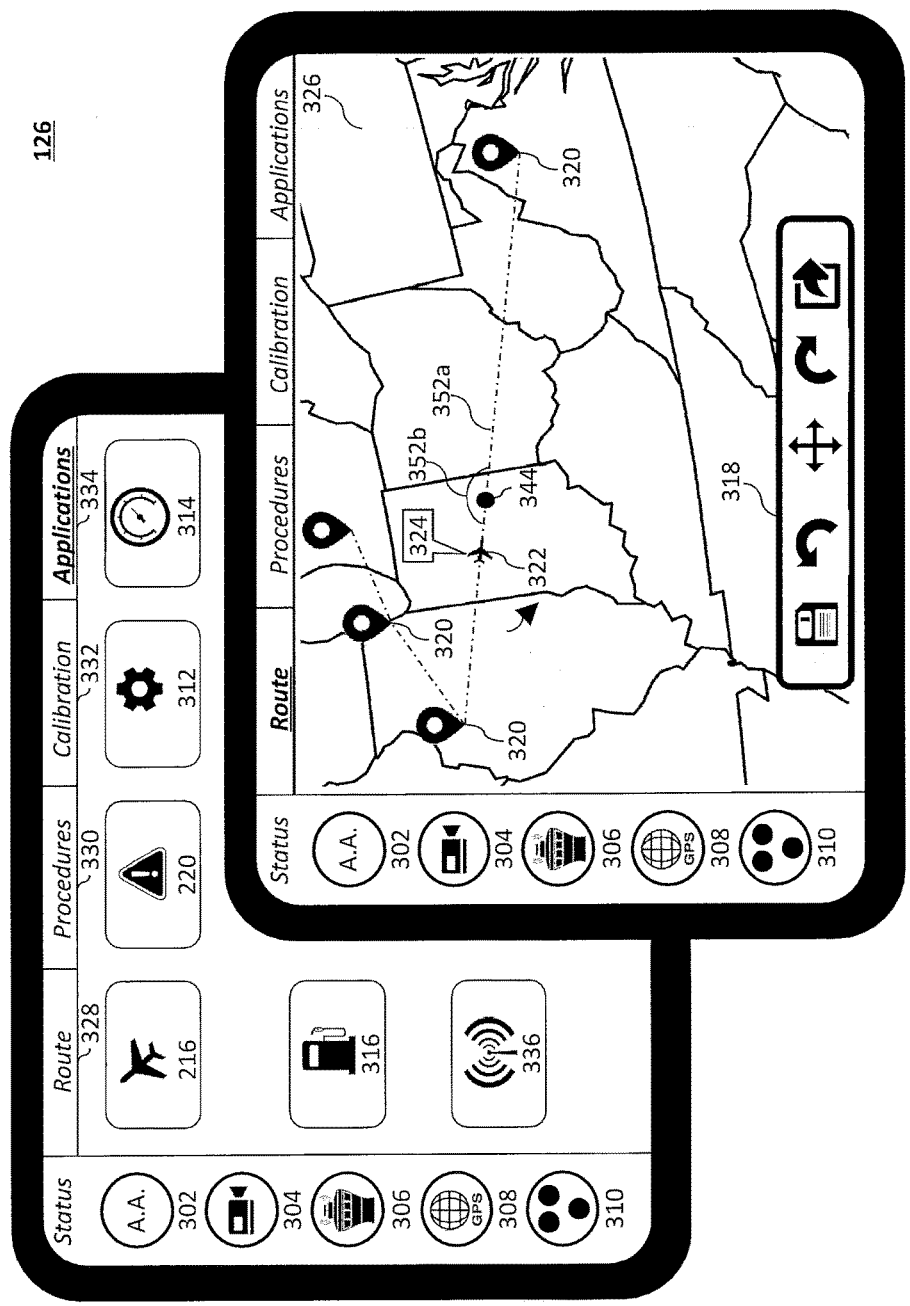
FIG. 3a illustrates a first example human-machine interface illustrating a route application.

FIG. 3a illustrates an example human-machine interface 126 having a single-screen touch interface and speech-recognition system. The HMI system 104 serves as a primary channel of communication between the pilot and the aircrew automation system 100, enabling the pilot to command tasks to and receive feedback or instructions from the aircrew automation system 100, to change the allocation of tasks between pilot and aircrew automation system 100, and to select which operational applications 202 are currently enabled for the aircrew automation system 100. As illustrated in FIG. 1b, for example, the HMI system 104 may receive status information from a subsystem of the aircrew automation system 100 via the core platform 102, while sending to the core platform 102 one or more mode commands generated by the HMI system 104 or input by the pilot. The pilot may be remote (e.g., on the ground or in another aircraft) or on-board (i.e., in the aircraft). Thus, in certain aspects, the HMI system 104 may be remotely facilitated over a network via communication system 122.

Human-machine interface 126. As illustrated in FIGS. 3a though 3e, the human-machine interface 126 may employ a tablet based GUI and a speech-recognition interface to enable vocal communications. An objective of the human-machine interface 126 is to enable the pilot to interact with the core platform's 102 knowledge base in manner akin to the way a pilot interacts with a human flight engineer or copilot.

The human-machine interface 126 can display the current state of aircrew automation system 100 (its current settings and responsibilities) as well as which operational applications 202 are currently installed, which operational applications are running and, if they are active, which actions the operational applications 202 are taking. The human-machine interface 126's GUI display may also be night-vision goggles compatible such that it is visible regardless of the pilot's eyewear. The speech-recognition system may be used to replicate the same types of verbal communications used by human flight crew when running through checklists and communicating on the flight deck. In certain aspects, the speech recognition may be limited to the same standards of codified communications used by pilot teams to minimize the chances of the system failing to recognize commands or changing into inappropriate modes of operations. The speech-recognition system may be configured to learn/recognize the speech of a given pilot through a voice training protocol. For example, the pilot may speak a predetermined script such that the speech-recognition system can become trained with the pilot's dialect.

The human-machine interface 126 may provide the status and/or details of various operations, including the entire aircrew automation system 100 via the aircrew automation status application 302, the perception system 106 via the perception status application 304, the obstacle sensor payload 162 via the sensor payload monitoring application 336, the autopilot via the autopilot status application 306 (where applicable), the GPS/INS system 154 via the GPS status application 308, and any other application or system status information 310. The display of the human-machine interface 126 may be customized by the pilot. For example, the pilot may wish to add, reorganize, or remove certain of the display icons and/or operational applications 202, which may be accomplished through a select and drag maneuver or through the aircrew automation settings application 312. The human-machine interface 126 may further inform the pilot regarding the aircraft's operating status and to provide the pilot with instructions or advice.

As illustrated, the human-machine interface 126 may provide a tool bar with various selectable tabs, such as a route tab 328, a procedures tab 330, a calibration tab 332, and an applications tab 334. When the pilot selects the applications tab 334, for example, the human-machine interface 126 may display the various operational applications 202 installed on the aircrew automation system 100 (e.g., the core platform 102), including, for example, a normal flight operation application 216, a contingency operation application 220, an aircrew automation settings application 312, a gauge application 314, a sensor payload monitoring application 336, and an aerial refueling application 316. Additional mission applications, however, may be included to facilitate performance of desired mission operations by the aircrew automation system 100.

Selecting the aircrew automation settings application 312 enables the pilot to change, reallocate, or otherwise edit the settings of the aircrew automation system 100 and/or to install operational applications 202. Selecting the gauge application 314 causes the human-machine interface 126 to display the various operational conditions of the aircraft, including, for example, position, direction, speed, altitude, pitch, yaw, etc. The various operational conditions of the aircraft, which may be gathered from the perception system 106, obstacle sensor payload 162, or another sensor, may be displayed as alphanumeric characters or as graphical dials (e.g., in accordance with the pilot's preference settings). Selecting the aerial refueling application 316 icon causes the aircrew automation system 100 to perform a predetermined protocol for facilitating or coordinating a mid-air refueling operation. For example, upon selecting the aerial refueling application 316, the aircrew automation system may coordinate with another aircraft to facilitate refueling and perform the necessary checklists for doing the same (e.g., ensuring aircraft position, airspeed, fuel hatch opening, etc.).

When the pilot selects the route tab 328, the human-machine interface 126 may display an area map 326 with an icon 322 representing the current location of the aircraft along a flight path relative to its various waypoints 320. Selecting (e.g., tapping, clicking, etc.) the icon 322 causes a dialog window 324 on the display to provide the various operational conditions of the aircraft (e.g., identification, altitude, speed, heading, etc.). The area map 326 may be saved, exported, rotated, or panned using a map control window 318. The area map 326 may be saved or exported (e.g., via communication system 122) as a static image or a data set (or database). When the pilot selects the calibration tab 332, the human-machine interface 126 may display the calibration of the aircraft, whereby the pilot may be further enabled to revise the same. The area map 326 may be configured to display one or more routes 352 generated by the route manger 160, including the original route 352*a* and, where applicable, an obstacle-avoidance navigational route 352*b* (or other deviation) to avoid an obstacle 344.

Figure 3B:
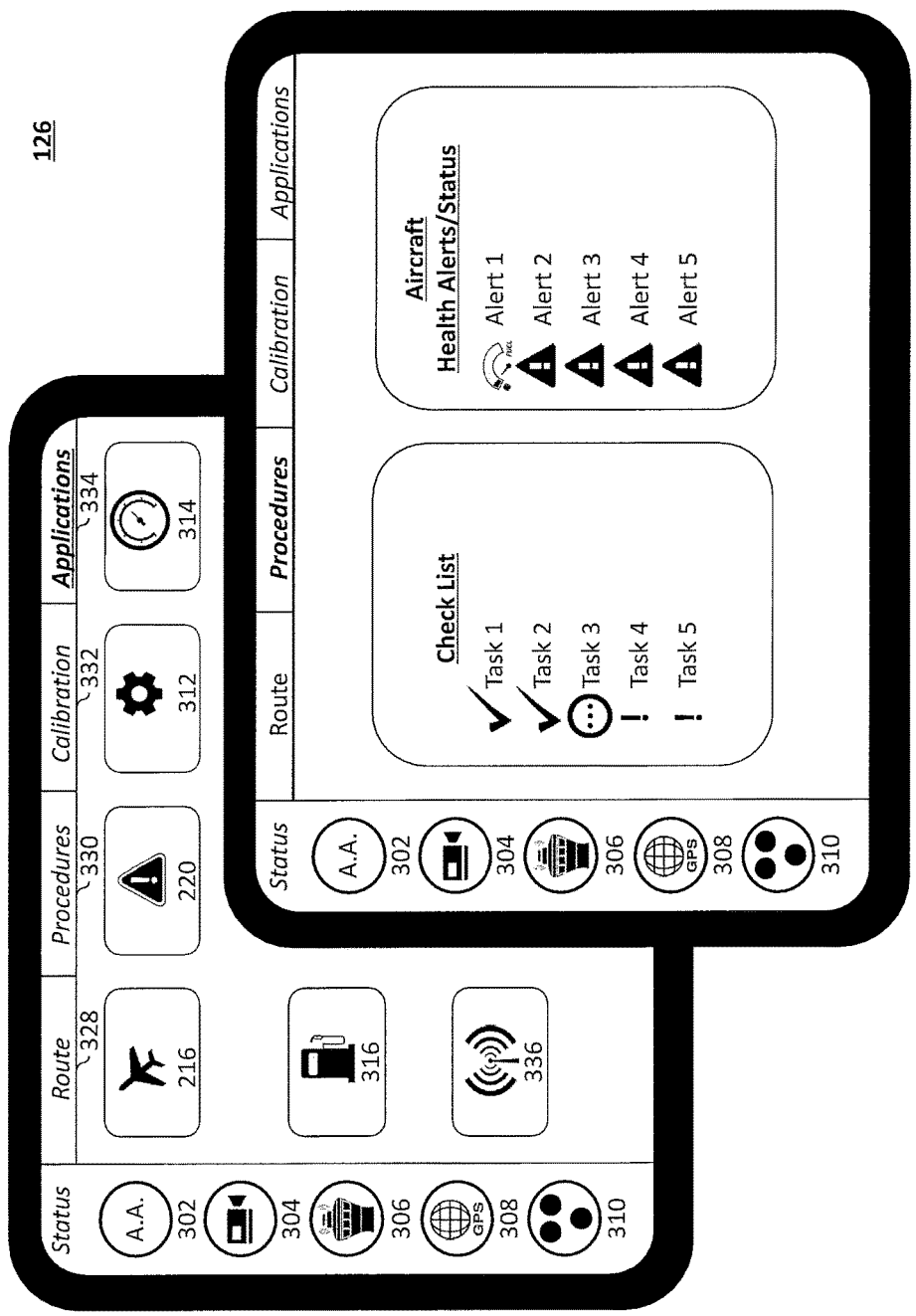
FIG. 3b illustrates a second example human-machine interface illustrating a procedural checklist and aircraft health alert screen.

The HMI system 104 may provide an intuitive display and interface that includes checklist verification and health alerts from the core platform 102 and predictions of aircraft state (e.g., fuel consumption and predicted remaining range), as well as failure prognosis and deviation alerts (e.g., "Left engine EGT is 5 degrees above normal and rising" and "imminent collision with non-cooperative detected"). Thus, when the pilot selects the procedures tab 330, as illustrated in FIG. 3*b*, the pilot may review and monitor checklist items, as well as review any health alerts. Indeed, a function of the HMI system 104 is to facilitate checklist monitoring and/or execution, marking items as complete when the when the perception system 106 perceives their completion and provides warnings to the pilot when items are not completed, as based on information previously imported from, for example, a Pilot's Operating Handbook ("POH"). The aircrew automation system 100 also monitors system health, comparing the current system state to that expected based on the POH and other knowledge sources, and guides appropriate responses to contingencies. In certain aspects, either the pilot or the core platform 102 can acknowledge checklist actions as they are performed and the HMI system 104 automatically proceeds to the correct checklist as appropriate. The HMI system 104 may give visual and auditory alerts to direct the pilot's attention to unattended checklist items, instruments that are displaying out-of-normal range values, or predicted events as the aircraft proceeds through the flight plan, which can be entered as a series of waypoints (for instance). For example, as illustrated, a list of tasks may be provided alongside indicators that indicate whether the task has been completed, is being completed, or needs to be completed (e.g., a "check mark" icon to include complete, an "in progress" icon, and a "to be completed" icon). Similarly, a list of health hazards may be provide, along with one or corresponding icons to indicated one or more operational conditions that are out of range. For example, a low fuel indicator may be provided alongside a low fuel icon if fuel is low.

Figure 3C:
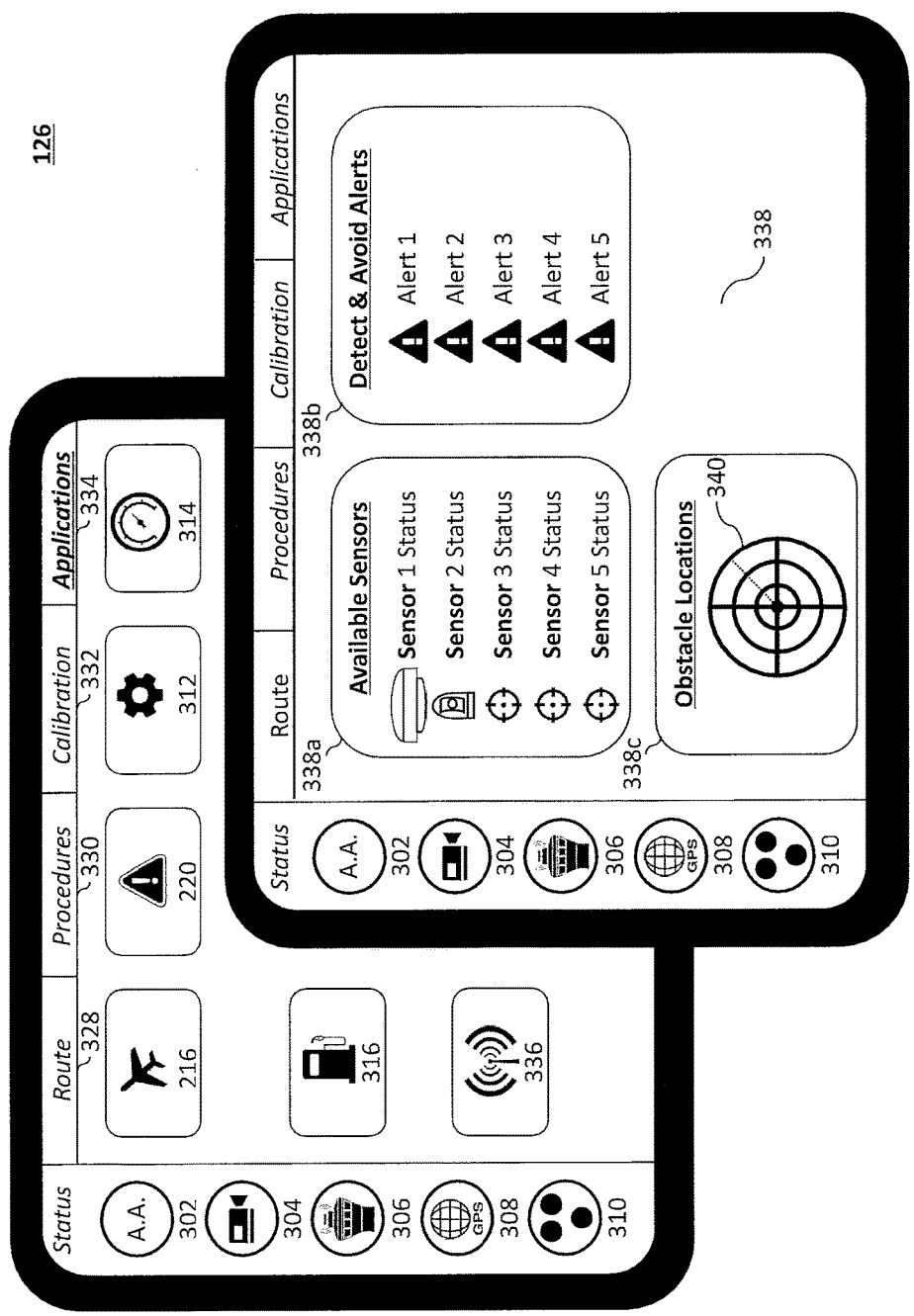
FIGS. 3c through 3e illustrate a third example human-machine interface illustrating an obstacle detection home screen.

Selecting the sensor payload monitoring application 336 icon causes the human machine interface 126 to display an obstacle detection home screen 338, such as the example obstacle detection home screen 338 illustrated in FIG. 3*c*. The obstacle detection home screen 338 may display a plurality of status/alert windows including, inter alia, an available sensor status window 338*a*, a detect/avoid alert window 338*b*, and an obstacle location window 338*c*.

The available sensor status window 338*a* may display, inter alia, a list of the various available sensors coupled to obstacle sensor payload 162. The status (e.g., operational, malfunctioning, service due, calibration required, etc.) may be provided adjacent its respective sensor name and/or icon. The detect/avoid alert window 338*b* may display one or more alerts based at least in part on data from the obstacle sensor payload 162. The alerts may provide information concerning any obstacles (e.g., cooperative and non-cooperative obstacles) within a field of view of the aircraft, including the existence and location of any detected obstacles. The alerts may be automatically organized in accordance with their relative importance to each other. To that end, each alert type may be assigned a weight (or rank) such that the alerts are listed and sorted based on hierarchy. For example, imminent threats (e.g., an imminent collision threat—such as an obstacle within a predetermined distance 342*a*) may be listed first, followed by intermediate threats (e.g., an obstacle beyond the predetermined distance 342*a*, but within a second predetermined distance 342*b*), and finally by general status alerts (e.g., obstacles within the field of view of the aircraft). In certain aspects, the alerts may be color coded such that imminent threats are a first color (e.g., red, possibly accompanied by an auditory sound), intermediate threats are a second color (e.g., yellow), and general status alerts are a third color (e.g., green, black, etc.). The obstacle location window 338c may provide a graphical representation 340 of the alerts (and other information) provided by the detect/avoid alert window 338b. The operator may select, via the human-machine interface 126, the graphical representation 340 to enlarge the obstacle location window 338c and/or graphical representation 340, an example of which is illustrated in FIG. 3d.

Figure 3D:
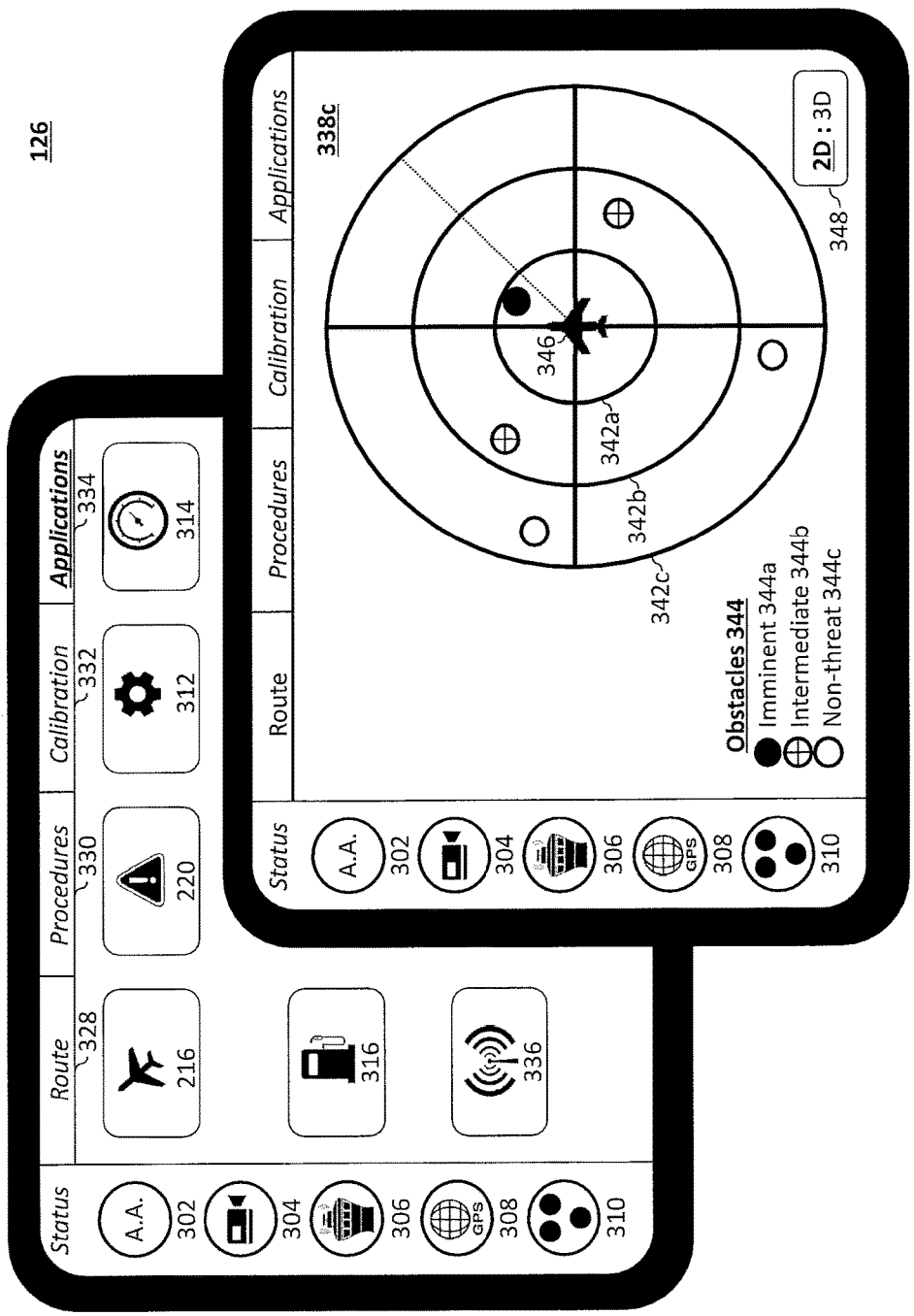
Figure 3E:
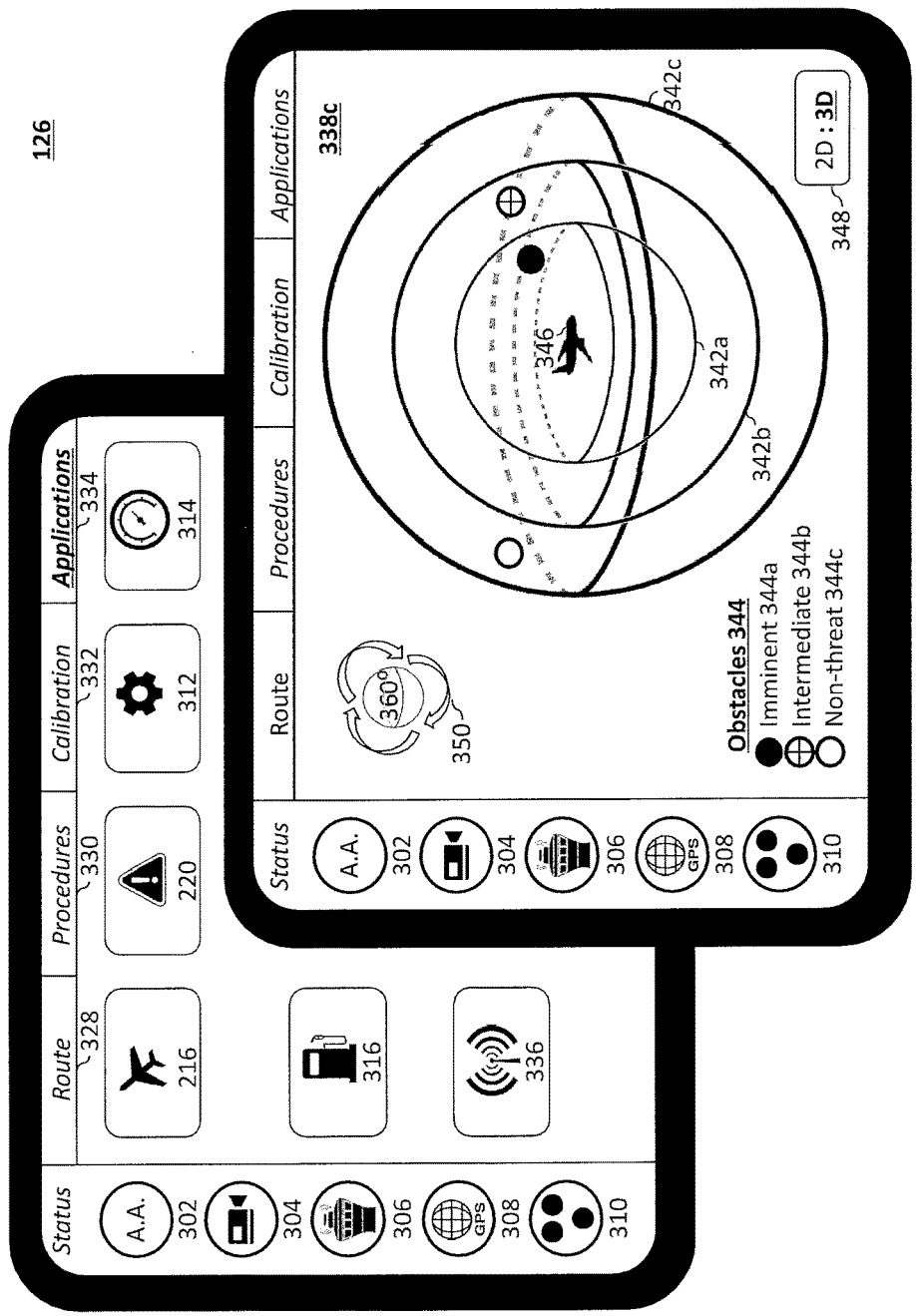

With reference to FIG. 3d, the obstacle location window 338c may be enlarged to display the graphical representation 340 in detail. For example, the graphical representation 340 may illustrate all obstacles 344 detected (e.g., by the obstacle sensor payload 162) within the field of view 342c of the aircraft 346. The obstacles 344 may be, for example, cooperative obstacles (e.g., cooperative aircraft) or non-cooperative obstacles (e.g., non-cooperative aircraft and other flying object, such as birds). Based at least on proximity (in terms of vertical/altitude and horizontal distance) of the obstacle to the aircraft 346, each of the obstacles 344 within the field of view 342c may be illustrated as one of an imminent threat obstacle 344a, an intermediate threat obstacle 344b, and/or a non-threat obstacle 344c. For example, an imminent threat obstacle 344a may be identified if the obstacle 344 is within a predetermined distance 342a of the aircraft 346, while an intermediate threat obstacle 344b may be identified if the obstacle is beyond the predetermined distance 342a of the aircraft 346, but within a second predetermined distance 342b. Obstacles 342 that are within the field of view 342c, but not within a second predetermined distance 342b (or at a sufficiently different altitude from the aircraft 346), may be identified as a non-threat obstacle 344c. While the graphical representation 340 of FIG. 3d is generally illustrated with proximity in terms of two dimensions (e.g., the X-Y plane defined by the X-axis and Y-axis), the graphical representation 340 may be illustrated to resemble a three-dimensional depiction (the X-axis, Y-axis, and Z-axis) to better illustrate obstacles 344 detected proximate to the aircraft 346, an example of which is illustrated in FIG. 3e. To toggle between two- and three-dimensional views, the operator may select (e.g., tap to toggle) the 2D/3D icon 348. When in the three-dimensional view, the operator may further pan and/or rotate the graphical representation 340 using a pan/rotate icon 350, or by simply engaging the graphical representation 340 through a tap and drag movement until the operator has achieved a desired view. In certain aspects, any blind spots (i.e., airspace that is not monitored by sensors) may be illustrated as shaded to indicate to the operator that potential obstacles may exist in the shaded region of airspace.

In addition to proximity, the graphical representation 340 may provide various operational conditions of the obstacles 344. For example, the graphical representation 340 may display, for each detected obstacle 344, inter alia, the identification (e.g., a tail number, if known), altitude, speed, heading, status (e.g., cooperative or non-cooperative), etc. The operational conditions may also be used as a factor in determining a threat status to the aircraft 346 for a given obstacle 344. For example, the core platform 102 may determine (based at least in part on data from the obstacle sensor payload 162) that an obstacle 344, which should be a non-threat obstacle 344c based on current location, could become an imminent threat obstacle 344a (or an intermediate threat obstacle 344b) based on speed and/or heading of the non-threat obstacle 344c within a predetermined period of time (e.g., a short period of time, e.g., 1 to 10 minutes, or about 1 minute). In which case, the core platform 102 may escalate, as appropriate, the obstacle 344 from a non-threat obstacle 344c to an imminent threat obstacle 344a (or an intermediate threat obstacle 344b), regardless of the obstacle's 344 present location proximate to the aircraft 346.

Task Allocation.

The HMI system 104 can enable the pilot to limit the activities executed by the aircrew automation system 100, if any. The HMI system 104 may define the allocation of tasks between the pilot and aircrew automation system 100, their responsibilities, and the communication of information between the two, thereby functioning as a collaborative teammate of the pilot. Thus, the aircrew automation system 100 may operate, depending on configuration, in a purely advisory role (i.e., without any control over the aircraft), a fully autonomous role (i.e., controlling the flight control without pilot intervention), or an advisory role with the ability to control flight controllers. The HMI system 104 may be further designed to enable a pilot to go through a transitional phase, where the pilot specifies the aspects of flight operation for which the aircrew automation system 100 is responsible. For example, the HMI system 104 may display a list of tasks where the pilot may select whether the aircrew automation system 100 or the pilot is responsible for a given task on the list. The list of tasks may be provided to the HMI system 104 from a procedure editor, which is described below. Once the aircraft data structure 208 has been populated and refined such that the pilot better trusts the aircrew automation system 100, the pilot may allow aircrew automation system 100 to perform additional actions, transitioning the pilot from a primary mode to a supervisory mode (i.e., a fully autonomous role). In this supervisory mode, pilot interactions may be at a high, goal-based level, with the HMI system 104 supporting those tasks as well as allowing the operator insight at other levels for troubleshooting. As noted above, in certain aspects, all tasks may be performed by the pilot, leaving the aircrew automation system 100 to serve an advisory role.

Mode Awareness.

A risk when employing any automation system is the potential for mode confusion on the part of the pilot (e.g., where the pilot neglects a task believing that the automation system will handle the task). The HMI system 104 avoids such mode confusion by first generating the correct function and the above-described task allocation between the aircrew automation system 100 and the pilot. Indeed, the HMI system 104 allows the pilot to directly command and configure aircrew automation system 100 via the human-machine interface 126 and displays the information necessary for the pilot to understand what actions the aircrew automation system 100 is taking to ensure mode awareness. In other words, mode awareness generally refers to a state where the mode of the system matches the operational mode expected by the operator. The human-machine interface 126 may display the information necessary to ensure that the pilot is always aware of the mode in which aircrew automation system 100 is operating. Additionally, the HMI system 104 serves as the human interface for individual mission applications (e.g., operational applications 202).

Aircraft State Monitoring System 112.

The aircraft state monitoring system 112 collects, determines, or otherwise perceives the real-time aircraft state. As noted above, the aircraft state monitoring system 112 may perceive the real-time aircraft state through, inter alia, a direct connection (e.g., integral with or otherwise hardwired to the aircraft) to the aircraft and/or the perception system 106. The aircraft state monitoring system 112 may be further coupled to the obstacle sensor payload 162, whether directly or via the core platform 102, to obtain information reflecting any obstacles 344 in the airspace adjacent the aircraft.

When a perception system 106 is used, the aircraft state monitoring system 112 may include a dedicated controller (e.g., processor) or share the controller 402 of the perception system 106. The perception system 106, for example, may employ a combination of a vision system, an acoustic system, and identification algorithms to read or comprehend flight situation information displayed by cockpit instruments. Example cockpit instruments include, for example, an altimeter, an airspeed indicator, a vertical speed indicator, one or more compass systems (e.g., a magnetic compass), one or more gyroscopic systems (e.g., attitude indicator, heading indicator, turn indicator), one or more flight director systems, one or more navigational systems (e.g., very-high frequency omnidirectional range ("VOR"), non-directional radio beacon ("NDB")), etc. The perception system 106 may include a processor and one or more optical sensors (e.g., three or more lightweight machine vision cameras) trained on the instrument panel to maximize pixel density, glare robustness, and redundancy. The one or more optical sensors may be connected to the perception computer by a hard-wired connection, such as Ethernet. The one or more optical sensors should be installed with a line of sight to the instrument panel, thereby mitigating obstruction to the pilot.

The flight situation data perceived by the perception system 106 and/or the aircraft state monitoring system 112 may be encoded and provided to the core platform 102 in real-time. The open architecture of the core platform 102 enables the incorporation of additional data received via a data bus 124 to augment the flight situation data generated by the perception system 106 or obstacle sensor payload 162. As illustrated in FIG. 1b, for example, the aircraft state monitoring system 112 and/or the perception system 106 may receive commands and configuration data from the core platform 102, while sending to the core platform 102 status and flight situation information (e.g., flight situation data) gathered by the perception system 106 or otherwise collected by the aircraft state monitoring system 112.

Figure 4:
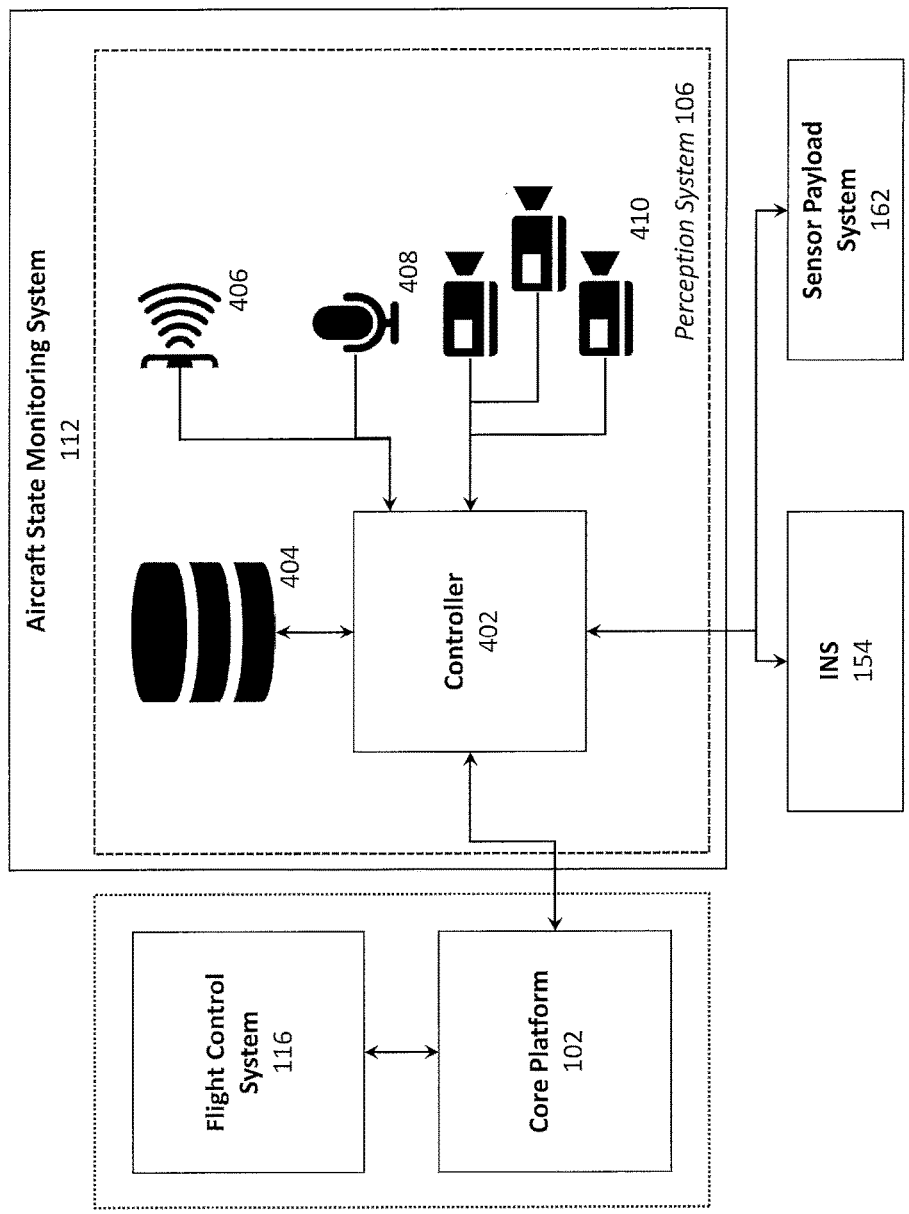
FIG. 4 illustrates a block diagram of an example aircraft state monitoring system having a perception system.

FIG. 4 illustrates an example perception system 106 operatively coupled with, inter alia, the core platform 102 (which is coupled to other subsystems, such as flight control system 116), the GPS/INS system 154, and obstacle sensor payload 162. The perception system 106 visually and/or acoustically monitors, inter alia, the cockpit instruments to generate flight situation data that can be used to derive the aircraft state from cockpit layouts, which may range from basic analog aircraft instruments to highly integrated, glass cockpit avionics suites. In addition to deriving physical state information, such as airspeed and altitude, the perception system 106 may also monitor instruments that are specific to aircraft systems such as fuel gauges and radios and provide secondary feedback about the status and positioning of the actuation system 108.

As illustrated, the perception system 106 may comprise a perception controller 402 that is operatively coupled with a database 404 and a plurality of sensors, such as cameras 410 (used for the vision system), microphone 408 (used for the acoustic system), and/or other sensors 406 (e.g., temperature sensors, positional sensors, inertial sensors, etc.). The perception controller 402 may be, for example, a processor configured to feed flight situation data to (or otherwise instruct) the core platform 102 based upon information received and manipulated information received from the plurality of sensors, the database 404, and external components, such as the GPS/INS system 154 and obstacle sensor payload 162.

Vision System.

The perception system 106 may employ a monocular or stereovision system, possibly including motion capture markers, to continuously monitor the state of the aircraft by reading what is displayed on the cockpit instruments. In certain aspects, by comparing information about a scene from two vantage points, 3D information can be extracted by examining the relative positions of obstructions in the two panels. The vision system may be used to accurately monitor instruments (e.g., glass gauges, physical steam gauges, etc.) and switches, as well as their positions in a variety of lighting conditions and cockpit layouts and sizes. Using a stereovision system and/or markers also provides sensing to prevent collisions between any robotic components and the pilot.

The vision system may employ a suite of high-definition, stereo cameras and/or a LIDAR laser scanner. The system may be capable of recognizing data from all flight instruments and derive the state of switches knobs and gauges that display the state of aircraft specific systems (e.g., remaining fuel). It may also be capable of recognizing the state of the panel with enough resolution to detect minor changes that result from pilot actions. Machine vision algorithms on the perception system's 106 computer 'read' the instruments (gauges, lights, wind correction angle panel, individual elements of the primary flight display or multi-function display in a glass cockpit) and mechanical items such as throttle levers, trim settings, switches, and breakers provide a real-time cockpit state update to the core platform 102.

The perception system 106 may be capable of deriving the aircraft state from cockpit layouts ranging from basic analog aircraft instruments to highly integrated, "glass cockpit" avionics suites. Through the vision system, the requirement for a data feed from the aircraft is obviated, which permits/increases portability across aircraft. However, when possible, the aircrew automation system 100 may also be coupled to an aircraft's data feed (e.g., through a data port). Further, using the application approach described for the core platform 102, different cockpit layouts can be addressed and understood using different underlying operation applications 202. For example, the aircrew automation system 100 may employ the gauge application 314 to derive the values displayed on the instruments, whether graphical dial (e.g., analog "steam" gauges or digital representations thereof) or a glass cockpit. This approach would also enable the aircrew automation system 100 to run operational applications that monitor, inter alia, weather radars, traffic displays, and terrain maps displayed in the cockpit.

In order to make aircrew automation system 100 portable, the process of rapidly learning a new cockpit layout and codifying subtle differences in location and scaling or unit of instruments is addressed by the perception system 106 design. For example, during the initial knowledge acquisition phase, the location and scale of instruments and switches can be encoded and verified for a particular aircraft, reducing the real-time task to the extraction of the position of the graphical dial (round dial) or number (glass cockpit), whether graphical dial gauges, CRT display, LCD, etc. The piece-wise planar structure of cockpit instrumentation enables the perception system 106 to construe the images (e.g., using Homography methods) and register it against the pre-mapped data generated during the initial knowledge acquisition phase. Accordingly, live imagery can be registered and compared against the previously annotated model, thereby greatly simplifying interpretation of the data.

Actuation System 108.

When desired, an actuation system 108 executes the actions commanded via the core platform 102 to guide the flight and overall operation of the aircraft. The aircrew automation system's 100 actuation system 108 executes the actions commanded by the core platform 102 to guide the flight and overall operation of the aircraft without interfering with the activities performed by the pilot. As illustrated in FIG. 1*b*, for example, the actuation system 108 may receive actuation commands and configuration data from the core platform 102, while sending to the core platform 102 status and response information generated by the actuation system 108.

Manned aircraft cockpits are designed for the human reach envelope and, therefore, all cockpit controls are reachable by a comparably sized robotic/mechanical manipulator. A manipulator capable of actuating every single switch, knob, lever and button on every single possible cockpit in high-G and vibration environments with the rapid execution required for emergency operation, however, would be expensive, heavy, and more invasive than what is desired for the aircrew automation system 100.

To more effectively achieve portability across aircraft, the aircrew automation system 100 may separate the actuation of primary flight controls (stick/yoke, stick, side-stick or collective, rudder pedals, brakes, and throttles) from the actuation of secondary flight controls (e.g., switches, knobs, rockers, fuses, etc.). This approach reduces the likelihood of designing a single point solution that becomes obsolete as aircraft evolve. Thus, the aircrew automation system 100 may employ a primary actuation system 108*a* and a secondary actuation system 108*b* to physically control the actuators in the cockpit. More specifically, the primary actuation system 108*a* may actuate the primary flight controls, while the secondary actuation system 108*b* may actuate the secondary flight controls, without obscuring the use of those controls by the pilot. The primary actuation system 108*a* and the secondary actuation system 108*b* are configured to collectively actuate all standard controls present on today's flight decks during flight operations.

As discussed below, the primary actuation system 108*a* focuses on actuating the primary flight controls (stick/yoke, stick, side-stick or collective, rudder pedals, brakes, and throttles), while the secondary actuation system 108*b* focuses on actuating the controls that are not as easily accessed by the primary actuation system 108*a*, such as secondary flight controls (e.g., switches, knobs, rockers, fuses, etc.).

Primary Actuation System 108*a*.

Figure 5A:
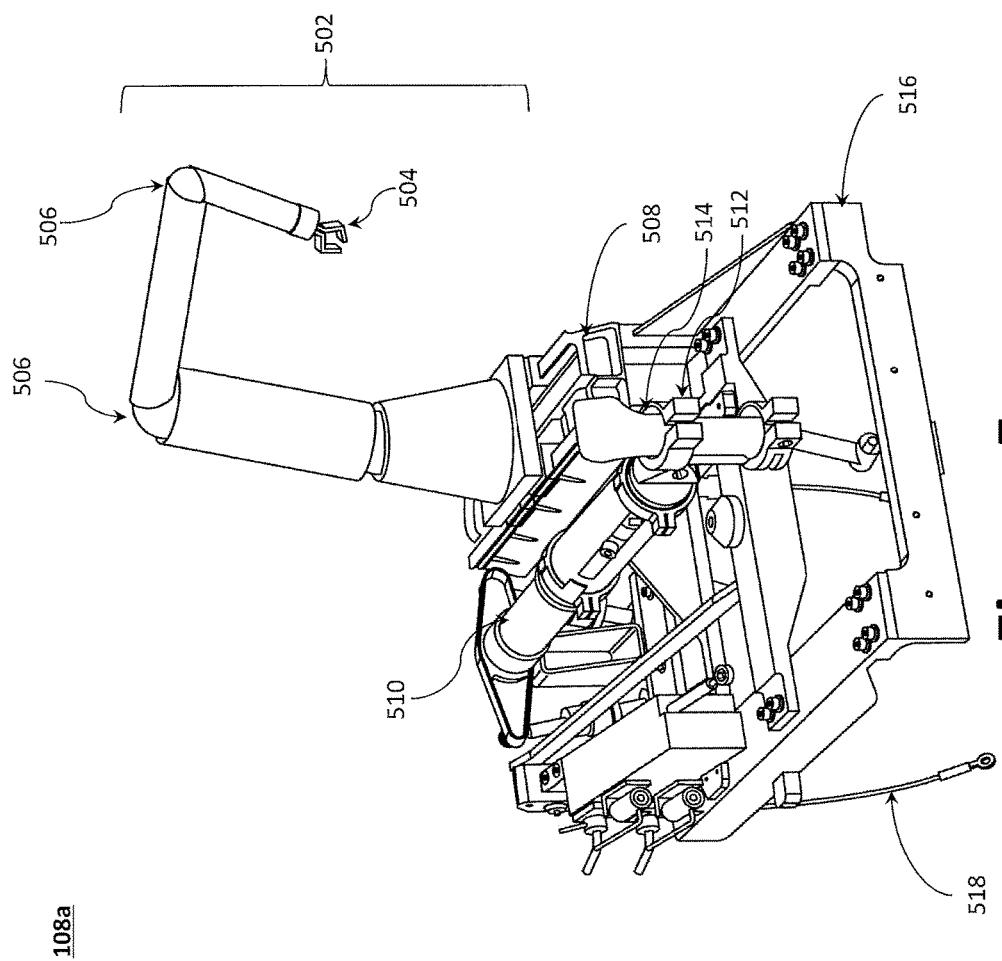
FIGS. 5a and 5b illustrate an example primary actuation system.
Figure 5B:
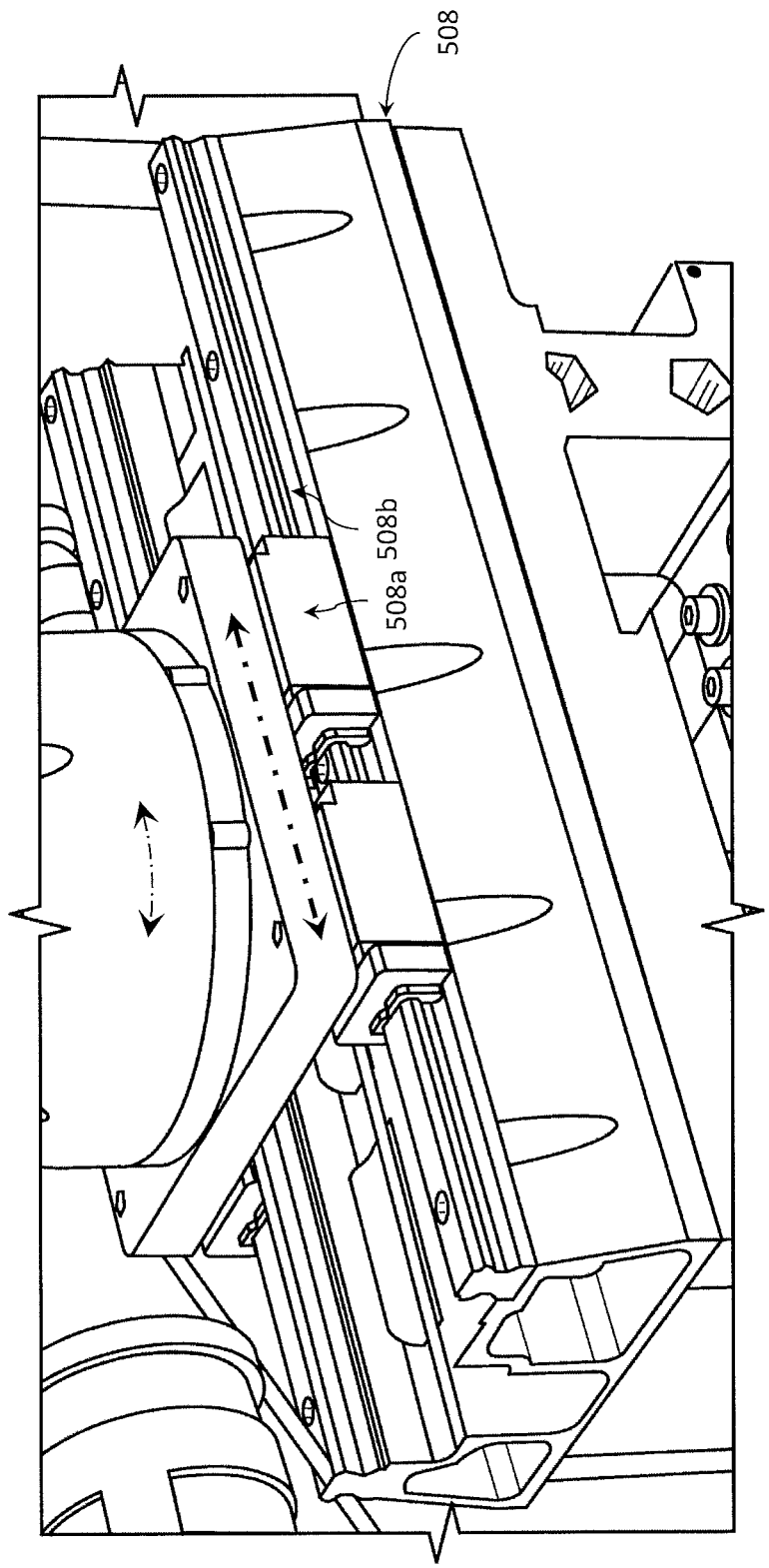

The primary actuation system 108*a* focuses on the set of controls necessary to safely operate the aircraft. As shown in FIGS. 5*a* and 5*b*, primary actuation system 108*a* includes a frame 516 having an articulating arm 502 (e.g., a robotic appendage or "arm") and stick/yoke actuator 510 that actuates the primary flight controls (yoke, stick, side-stick or collective, rudder pedals, brakes, and throttles) and other, easy to reach controls. The actuators may be one or more of linear (straight line), rotary (circular), or oscillatory actuators, which may be driven through one or more of electrical, pneumatic, and/or hydraulic techniques.

The frame 516 may be sized and shaped to fit within the seat of a standard aircraft. To that end, the frame's 516 footprint should be about the same size as, or smaller than, an average human's "seated" footprint. The actuation system 108 may be fabricated using lightweight metals, metal alloys, and/or composite materials.

Stick/Yoke Actuator 510.

The stick/yoke actuator 510 may couple to and engage the aircraft's existing stick/yoke 514 using a stick/yoke gripper 512. The stick/yoke gripper 512 may be sized and shaped such that it is universal and can engage various forms of stick/yokes and/or control wheels. The stick/yoke actuator 510 may be configured to move the stick/yoke 514 forward, backward, left, right, and positions therebetween. The stick/yoke gripper 512 may further comprise one or more actuators for actuating buttons and/or switches positioned on the stick/yoke 514.

Articulating Arm 502.

The actuator-controlled articulating arm 502 may be sized, shaped, and configured to occupy the space typically occupied by a co-pilot's arms, thereby ensuring portability across aircraft. To enable movement in multiple degrees of freedom ("DOF"), the articulating arm 502 may comprise a plurality of arm segments (whether linear, curved, or angled) joined using a plurality of hinged or pivotal joints 506. The articulating arm 502 may comprise a gripper 504 at its distal end. The gripper 504 may be coupled to the articulating arm 502 via a multiple-DOF connection. The base of the articulating arm 502 may be rotatable and slideably coupled to the frame 516 via a movable base 508. For example, the articulating arm 502 may be coupled with an upper base 508*a*, which is slideably coupled with a lower base 508*b*, which may be secured to the frame 516. The upper base 508*a* may slide relative to the lower base 508*b* using, for example, a combination of rails and ball bearings. In certain aspects, the upper base 508*a* may slide relative to the lower base 508*b* along both the X- and Y-axis.

The articulating arm 502 can be equipped with an encoder (e.g., twin 18-bit encoders) for each of its degrees of freedom to ensure exact positioning of the articulating arm 502. Internal clutches may be provided at each hinged or pivotal joint 506 such that the articulating arm 502 can be overpowered by the pilot if so desired, without damaging the articulating arm 502. In such a case, the aircrew automation system 100 may determine the position or location of the articulating arm 502 using the encoders.

The gripper 504 may be configured to couple, or otherwise engage, for example, throttle levers, etc. The gripper 504 may also provide force and pressure detection so as to allow the aircrew automation system 100 to estimate how a flight controls actuator is grasped and to adjust the motion to properly throw it. Once the motion is executed, the same feedback may be used to determine if the desired switch configuration has been achieved. In certain aspects, the articulating arm 502 may be fitted with an electronic device (e.g., a homing device) that enables it to find and hit an obstacle.

Secondary Actuation System 108*b*.

Unlike the primary flight controls, which are generally located in the same vicinity across aircraft makes and types, the location of the secondary flight controls (e.g., avionics, switches, knobs, rockers, toggles, covered switches, fuses, etc.) is not as consistent or spatially contained from aircraft to aircraft.

The secondary actuation system 108*b* focuses on actuating the controls that are not as easily accessed by the primary actuation system 108*a*. For example, some switches may even be on an overhead panel directly above the captain's head, making it potentially difficult to manipulate them with a robotic arm (especially in turbulent flight conditions). Accordingly, some actuators may be allocated to the above described primary actuation system 108a, while others may be allocated to a self-contained, secondary actuation system 108b.

Figure 5C:
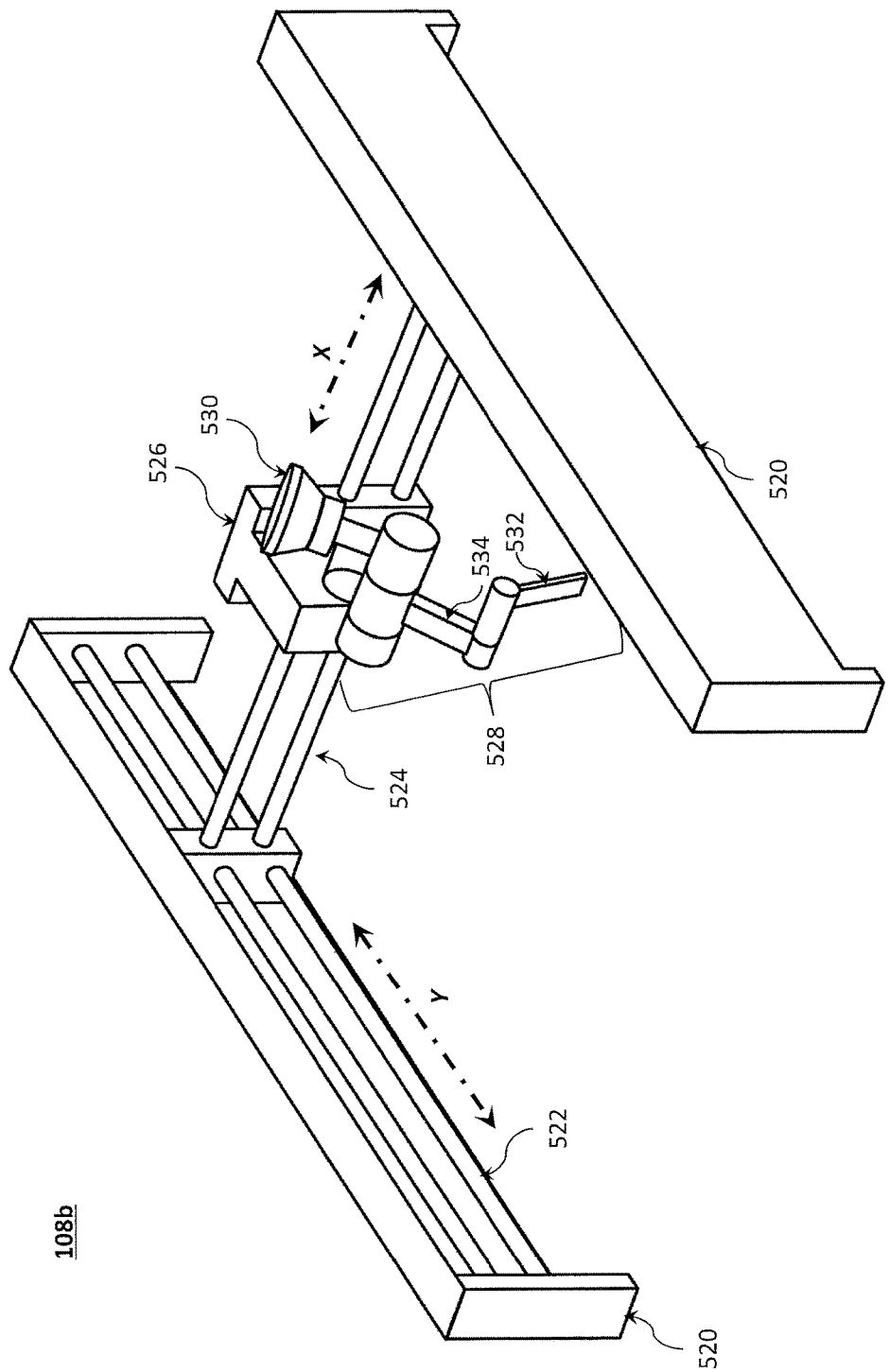
FIG. 5c illustrates an example secondary actuation system.

The secondary actuation system 108b may be provided in the form of an adaptable XY-plotter or gantry system mounted directly to the panel of interest and calibrated to the specific panel it is operating. The secondary actuation system 108b is preferably universal and resizable. An example XY-plotter is illustrated in FIG. 5c. The XY-plotter may comprise a square frame that serves as the rails 520 of the plotter, a rotatable multi-tool 528 with multiple interfaces (e.g., switch actuator 532 and knob actuator 530) capable of manipulating the controls of interest, and a control system that moves this multi-tool 526 within the frame along a Y-axis set of rails 522 and an X-axis set of rails 524.

When in use, the plotter moves the multi-tool 528 to the location, selects the correct manipulator interface, and manipulates the secondary flight control of interest. For example, the multi-tool 528 that can flip binary switches and/or covered switches using a switch actuator 532 and can twist knobs using a knob actuator 530. The switch actuator 532 and/or knob actuator 530 may be coupled to the multi-tool 528 via an articulating or rotating member, such as the rotatable switch arm 534.

When not in use, the multi-tool 526 may return to a home position (e.g., automatically navigate to a far corner) to prevent obstruction of the panel. The multi-tool 526 would be equipped with sensors (e.g., proximity sensors) such that it can move out of the way when it detects the pilot's hands. During the initial set-up of the plotter on a new aircraft, the location, type, and position of the secondary flight control panel may be encoded. Once a particular secondary flight control panel is encoded, the configuration can be saved to the aircraft data structure 208 and loaded when aircrew automation system 100 is installed in the same aircraft, or the same type of aircraft. In certain aspects, additional actuators may be provided to actuate controllers that are positioned in, for example, the foot well of the cockpit, such as foot pedals (e.g., brake and/or rudder pedals).

Obstacle Sensor Payload 162.

The obstacle sensor payload 162 may employ a plurality of sensors to identify and monitor obstacles external to the aircraft. In one implementation, the obstacle sensor payload 162 may be directly coupled to the core platform 102, or via another system, such as the aircraft state monitoring system 112, flight control system 116, or existing aircraft systems. The obstacle sensor payload 162, or components thereof, may be further configured to communicate wirelessly with the other systems of the aircraft or the aircrew automation system 100. As illustrated in FIG. 1b, for example, the obstacle sensor payload 162 may receive commands and configuration data from the core platform 102, while sending to the core platform 102 obstacle information concerning any cooperative and non-cooperative obstacles gathered by the obstacle sensor payload 162.

As discussed above, the obstacle sensor payload 162 may be operatively connected to the core platform 102 to enable the route manger 160 of the aircrew automation system 100 to generate an obstacle-avoidance navigational route to avoid one or more obstacles detected by the obstacle sensor payload 162, for example, based at least in part on the obstacle information. Further, the obstacle sensor payload 162 may communicate collected obstacle information to the aircraft state monitoring system 112 to alert an operator (e.g., via human-machine interface 126) of a possible collision, obstacle position, or other parameters thereof. In one aspect, the obstacle sensor payload 162 may employ both a radar sensor 412 and a camera (e.g., an infrared camera 414—a camera with an infrared sensor, a visible-near infrared EO sensor 416, or other optical sensors 418) to monitor the airspace adjacent the aircraft to detect cooperative and non-cooperative obstacles within its field of view, along its trajectory, etc.

The obstacle sensor payload 162 integrates multiple sensing modalities into a single package for tracking both cooperative and non-cooperative targets, implements the latest avoidance algorithms, and defines an open architecture whereby future sensing modalities or avoidance algorithms can easily be integrated. The obstacle sensor payload 162 utilizes multiple sensing modalities across the electromagnetic spectrum to determine relevant information regarding non-cooperative targets in the airspace. The obstacle sensor payload 162 employs a plurality of sensors for non-cooperative sensing, including, a radar sensor 412 that scans the airspace for objects (e.g., metallic objects), a long-wave infrared (thermal) sensor 414 that scans the airspace for thermal signatures, and a visible-near infrared electro-optic (EO) sensor 416 that scans the airspace to identify and aid in classifying objects The obstacle sensor payload 162 can aid the pilot as another set of "eyes and ears" for external perception applicable to all forms of aircraft. In one implementation, for example, the obstacle sensor payload 162 provides the physical pilot (whether in the air with the aircraft or on the ground) additional situational awareness. In another implementation, the obstacle sensor payload extends beyond the physical pilot's inputs and will enable direct integration with fly-by-wire systems, allowing it to take over control of an aircraft during lost link scenarios. Therefore, while the obstacle sensor payload 162 is discussed primarily in connection with the aircrew automation system 100, the obstacle sensor payload 162 may be provided as an add-on system to virtually any aircraft (e.g., Group 2-3 unmanned aircraft systems) to perform detect-and-avoid, which enables the aircraft to fly within the national airspace.

Radar Sensor 412.

Figure 6A:
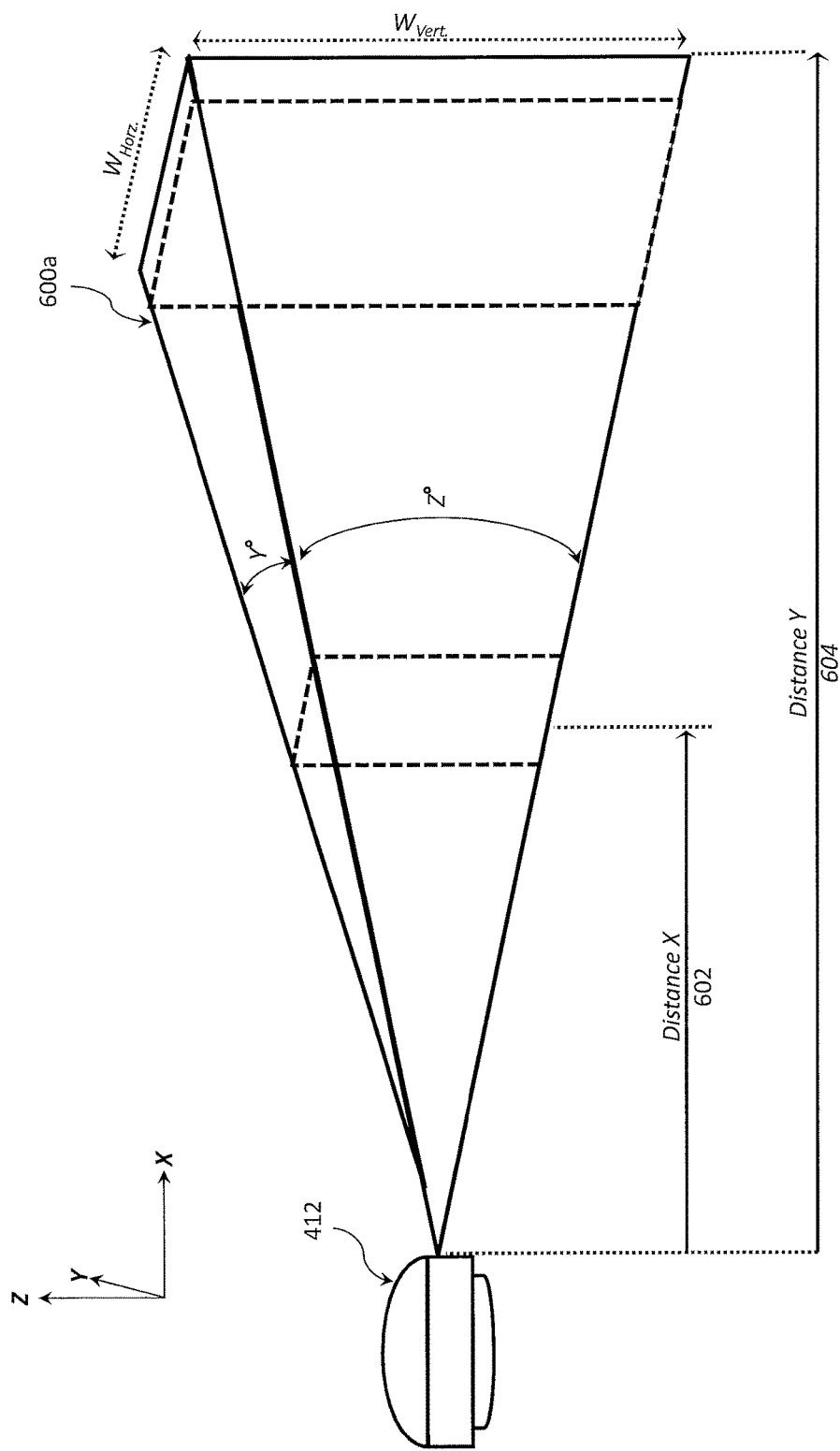
FIG. 6a illustrates an example radar and its resulting radar beam.

FIG. 6a illustrates an example radar sensor 412 and its resulting radar beam 600a. The radar sensor 412 may be mechanically rotated to provide a 360 degree field of view. The radar sensor 412 may be, for example, an active electronically scanned array, a passive electronically scanned array, a metamaterial electronically canned array radar, a weather radar or a marine radar. To facilitate use with small aircraft, the radar sensor 412 is preferably compact, lightweight, and low cost. A suitable radar sensor 412 includes marine radars, such as the Furuno DRS4D-NXT Solid-State Doppler Radar, which is 16 pounds and about 24" (L) by 24" (W) by 9" (H). The Furuno DRS4D-NXT Radar provides a field of view of 2° (V)×25° (H), adjustable antenna rotation speeds of 24, 36, and 48 RPM, and a range of up to 36 miles.

The radar sensor 412 may be configured to monitor the airspace adjacent the aircraft (e.g., a circular airspace about the aircraft 700) for both cooperative and non-cooperative obstacles. As illustrated, when in a fixed position, the radar sensor 412 provides a relatively narrow horizontal beam width ($W_{Herz.}$) at Y°, but provides a wide vertical beam width ($W_{Vert.}$) at a Z°, which results in a radial cone of radar-monitored airspace. Specifically, depending on the marine radar's specifications, the radar sensor 412 may provide a 2° (H) (e.g., Y°=2° of 360°)×25° (V) (e.g., Z°=25° of 360°) field of view. As can be appreciated, the beam dimensions of the radar beam 600a from the radar sensor 412 increase as a function (e.g., a linear function) of the distance from the radar sensor 412 to the obstacle. Specifically, with reference to FIG. 6a, the cross sectional dimension of the radar beam 600a at distance Y 604 would be larger than the cross sectional dimension at distance X 602. For example, assuming a 2° (H)×25° (V) field of view, the cross sectional dimension at 6 miles from the radar sensor 412 (i.e., distance X=6 miles) may be, in voxels, 2,200 ft (H)×14,000 ft (V), while the beam dimension at 36 miles (i.e., distance Y=36 miles) may be 13,000 ft (H)×84,000 ft (V). Note that the ratio of the beam dimension in terms of horizontal (H) width to vertical (V) width stays substantially constant along the distance.

To provide greater coverage, the radar sensor 412 may be configured to rotate using a mechanically rotating base structure. For example, the mechanically rotating base structure may couple with the radar sensor 412 via a drive shaft to provide a mechanically rotating radar system to scan the airspace in a radial pattern about the aircraft. Rotating the radar sensor 412 provides full 360° coverage about the aircraft (in the X-Y plane) and a 25° azimuthal field of view (in the X-Z plane). The radar sensor 412 may be continuously rotated at a predetermined rotational speed, such as 20 to 80 revolutions per minute (RPM), more preferably 40 to 60 RPM, most preferably 48 RPM (e.g., 0.8 Hz). While the radar sensor 412 suffers from poor resolution compared to other technologies, a significant advantage of the radar sensor 412 is its range and relatively lower cost.

The radar sensor 412 may be housed in a dome or other structure to protect the radar equipment. The geometrical shape of the dome may be aerodynamic to mitigate drag while travel through the air. The dome is preferably manufactured from material transparent to radio waves, and prevents contaminants (e.g., ice, freezing rain, dirt, debris, etc.) from accumulating directly on the radar equipment, such as the surface of radar antennas. In the case of a rotating/spinning radar dish antenna, the dome also protects the antenna from debris and rotational irregularities due to wind. In operation, the radar sensor 412 may combine radar data collected with data collected by other sensors (or data sources) available to the obstacle sensor payload 162 for communication to the core platform 102.

Cameras/Optical Sensors.

As noted above, the obstacle sensor payload 162 further employs one or more optical sensors (e.g., cameras) configured to pan and tilt, such as an infrared camera 414 to scan the airspace for thermal signatures and a visible-near infrared electro-optic (EO) sensor 416 to scan the airspace to identify and aid in classifying objects. Therefore, while an infrared camera 414 will be primarily described, other optical sensors 418 may be similarly used in addition to, or in lieu of, the infrared camera 414, including, inter alia, ultraviolet, visible, near-infrared, short wave infrared, mid wave infrared, long wave infrared (LWIR), bolometer, electro-optical cameras, LIDAR, LED projection, structured light, multi-view reconstruction, etc.

Figure 6B:
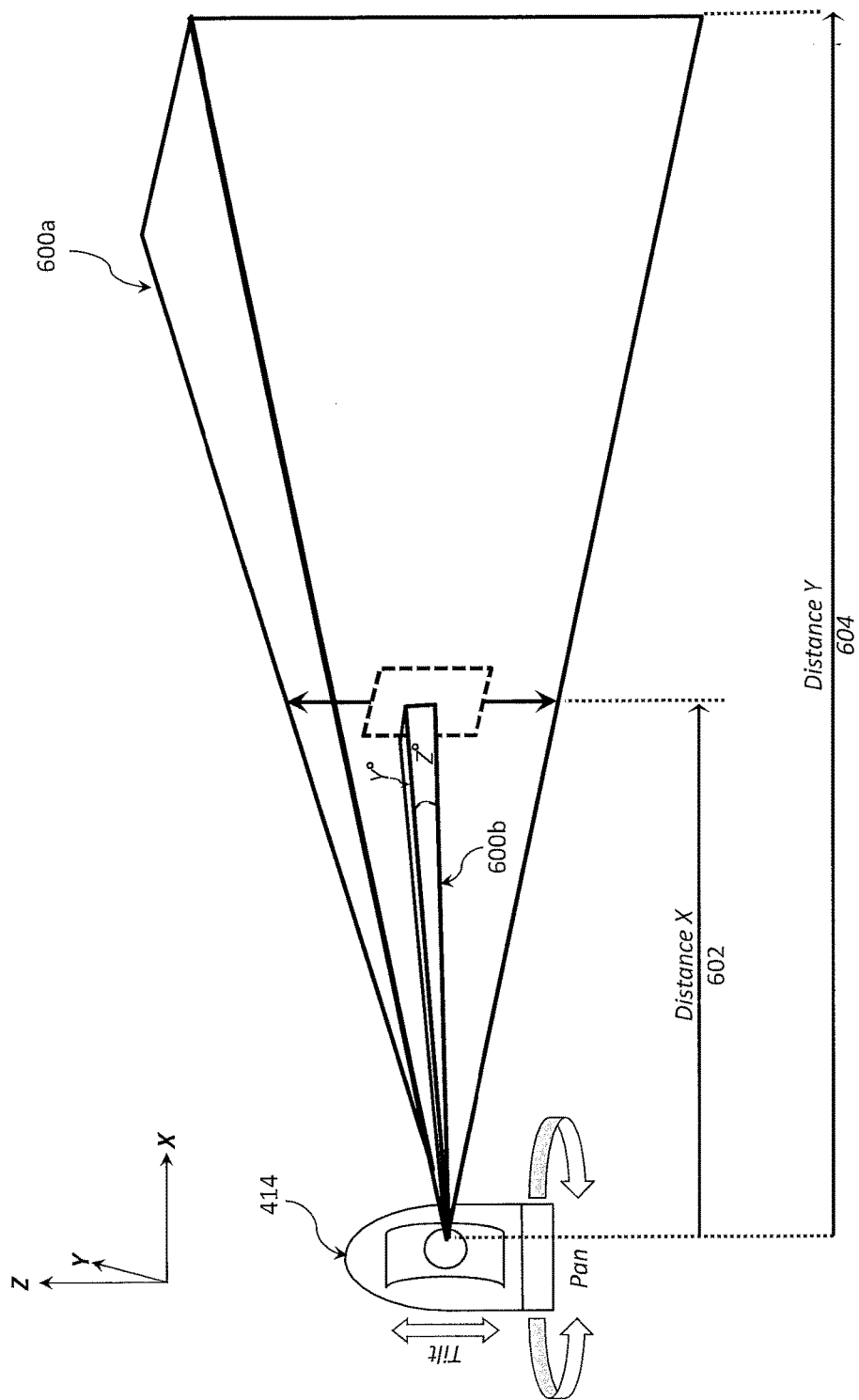
FIG. 6b illustrates an example infrared camera and its resulting infrared beam relative to the radar beam.

FIG. 6b illustrates an example infrared camera 414 and its resulting infrared beam 600b relative to the radar beam 600a. The infrared camera 414 may be a long wavelength infrared (LWIR) camera. An advantage of infrared cameras 414 is its thermal imaging functionality. To facilitate use with small aircraft, the infrared camera 414, like the radar sensor 412, is preferably compact, lightweight, and low cost. A suitable infrared camera 414 includes the FLIR model M-612L Thermal Night Vision System, which is 9 pounds and about 7" (L) by 7" (W) by 12" (H). The FLIR model M-612L provides a 640×480 VOx Microbolometer sensor, a 50 mm Focal Length with a 12° (H)×9° (V) (NTSC) field of view, and zooming functionality.

Like the radar sensor 412, the infrared camera 414 may be configured to monitor the airspace around the aircraft for both cooperative and non-cooperative obstacles, however at a higher resolution and a shorter range. As illustrated, when in a fixed position, the infrared camera 414 provides a horizontal beam width ($W_{Herz}$) at Y° that is wider than the vertical beam width ($W_{Vert.}$) at a Z°. Specifically, depending on the infrared camera's specifications, the infrared camera 414 may provide a 12° (H) (e.g., Y°=12° of 360°)×9° (V) (e.g., Z°=9° of 360°) field of view, although other fields of view are available, such as 24°×18°, 25°×20°, etc. Based on a 12° (H)×9° (V) field of view, for example, the cross sectional dimension of the infrared beam 600b at 6 miles (e.g., distance X=6 miles) may be 7,000 ft (H) by 5,200 ft (V). The cross sectional dimension of the infrared beam 600b increases linearly as a function of distance from the infrared camera 414, however resolution decreases with distance. The infrared camera 414, however, provides significantly greater resolution than the radar sensor 412. At 6 miles, for example, the infrared camera 414 can provide pixel coverage of 11 ft×11 ft per pixel, which is approximately 500 times greater in resolution than the radar sensor 412 at the same distance.

Compared to the radar beam 600a at distance X 602, the infrared beam 600b of the infrared camera 414 at distance X 602 is approximately half the size along the vertical axis (Z-axis). To compensate for the narrower field of view along the vertical axis, the infrared camera 414 may be configured to pan and tilt. For example, the infrared camera 414 may be configured to tilt up and down (e.g., +1-90°) to enlarge the vertical field of view, while also configured to pan left (port) and right (starboard) (i.e., rotate 360° to provide a continuous pan) to enlarge the horizontal field of view. The infrared camera 414 may pan continuously or in steps (e.g., incremental lock steps), each step being a radial sector. In certain aspects, the infrared camera 414 may continuously pan left/right and tilt up/down to cover uncertain voxels of the radar sensor 412 (e.g., 25°×2°). Indeed, the infrared camera 414 may provide a measureable field of view that is equal to or greater than the field of view dictated by the Federal Aviation Administration (FAA). Therefore, while the infrared camera 414 suffers from poor range and a narrower vertical field of view (e.g., making it difficult to provide 360-degree coverage), an advantage of the infrared camera 414 is its high resolution.

Like the radar sensor 412, the infrared camera 414 (or another camera type, as the case may by) may be housed in a dome or other structure to protect the camera equipment, which may include a optically transparent portions to facilitate operation of the infrared camera 414. The radar sensor 412 and the infrared camera 414 may share a dome (e.g., a single payload pod), or be positioned in separate domes, which may be co-located or individually positioned on the aircraft. In operation, the infrared camera 414 may combine infrared camera data collected with data collected by other sensors (or data sources) available to the obstacle sensor payload 162 for communication to the core platform 102.

By way of illustration, an aircraft equipped with an obstacle sensor payload 162, may (1) detect a non-cooperative obstacle at a known distance and velocity at a first resolution via the radar sensor 412 and (2) image the non-cooperative obstacle at a second resolution (i.e., higher resolution) via a camera (e.g., the infrared camera 414, a visible-near infrared EO sensor 416, or other optical sensors 418). A processor, whether integrated with the obstacle sensor payload 162 or as part of the core platform 102, may combine the information from the radar sensor 412 with the camera to identify the non-cooperative obstacle. For example, the processor may combine the radar cross section from the radar sensor 412 with the optical cross section from the visible-near infrared EO sensor 416 and the thermal cross section from the infrared camera 414.

As would be understood to those of ordinary skill in the art, a radar cross section generally refers to the measure of a target's (i.e., the non-cooperative obstacle) ability to reflect radar signals in the direction of the radar sensor 412 (e.g., at the obstacle sensor payload 162). In other words, the radar cross section provides a measure of the ratio of backscatter power per steradian (unit solid angle) in the direction of the radar (from the target) to the power density that is intercepted by the target. Correspondingly, an optical cross section refers to the value that describes the maximum amount of optical flux reflected back to the source from the non-cooperative obstacle, while the thermal cross section reflects the thermographic measurement data from the infrared camera 414 descriptive of the non-cooperative obstacle. In certain aspects, the obstacle sensor payload 162 may be configured to identify the non-cooperative obstacle with incomplete information. For example, if only the radar sensor 412 detects the non-cooperative obstacle, the processor coupled to the obstacle sensor payload 162 can instruct the aircraft to create a large cylindrical avoidance zone, whereas information from the cameras may be used to limit the avoidance zone to a small spherical avoidance zone.

Figure 7:
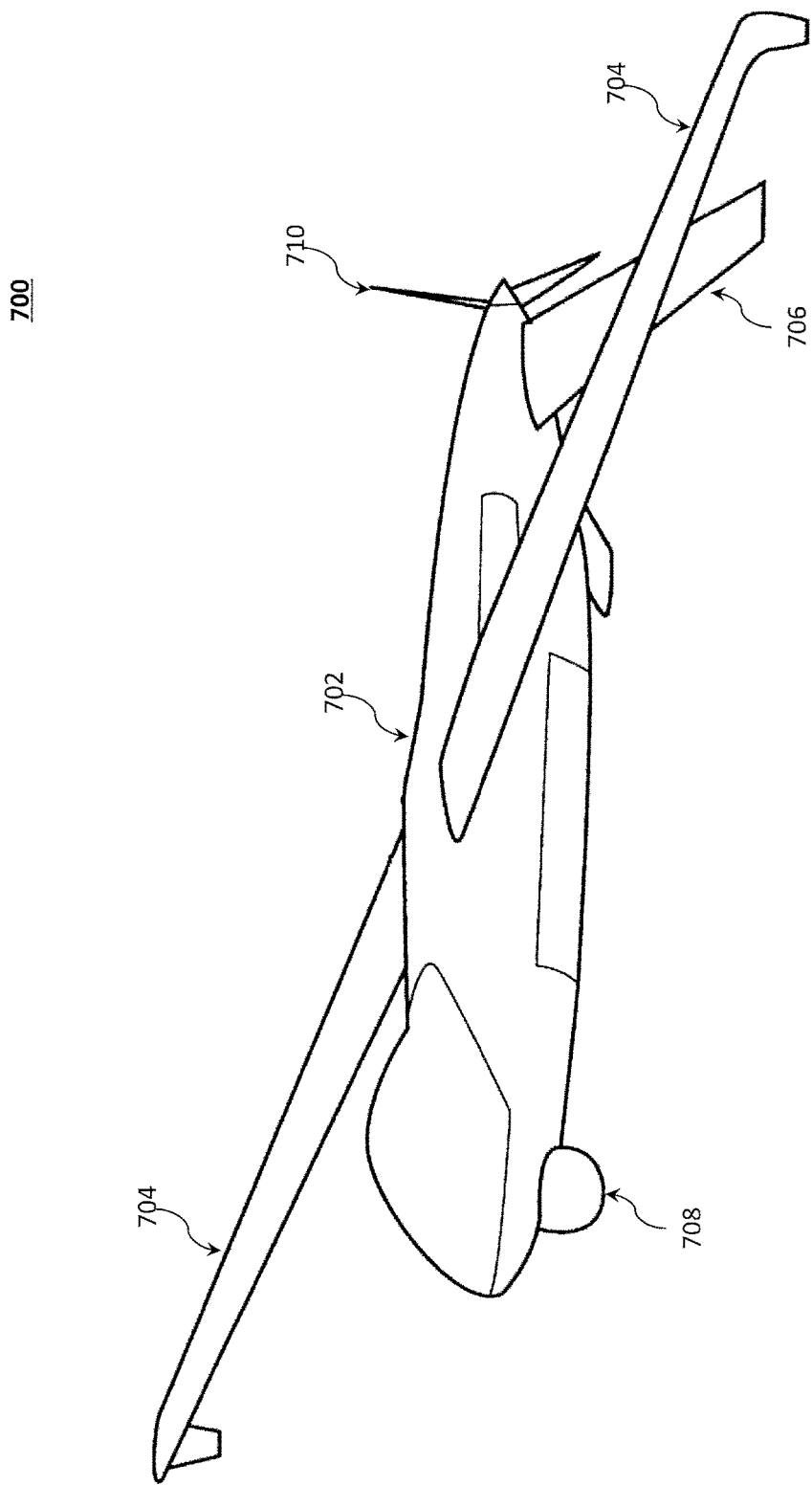
FIG. 7 illustrates an example fixed-wing aircraft having a payload pod to house the obstacle sensor payload.

FIG. 7 illustrates a perspective view of an example aircraft 700 having a fuselage 702, one or more wing panels 704 (or other flight surface), an empennage 706, a payload pod 708, and one or more propulsors 710 (e.g., a jet engine, one or more propellers axially driven by an engine or electric motor, etc.). The obstacle sensor payload 162 may externally or internally coupled to the aircraft depending on the type of sensor. For example, the obstacle sensor payload 162 may be configured within a payload pod 708 of the aircraft 700. While the aircraft 700 of FIG. 7 is illustrated as a fixed-wing aircraft, the subject disclosure is not limited to a particular aircraft configuration and may be applied to virtually any aircraft configuration, including multi-rotor VTOL aircraft.

The payload pod 708, which may house, inter alia, the obstacle sensor payload 162, or portions thereof, can be rotatably and pivotally coupled to the fuselage 702 (or another structural components) via a gimbal system. For example, the payload pod 708 may be coupled to the foreword end of the fuselage 702 to enable the payload pod 708 to be more easily oriented forward to monitor for obstacles along the aircraft's 700 flight path or trajectory. The obstacle sensor payload 162 may be coupled to the aircraft 700 in a non-invasive manner to allow for easy removal and/or re-location to another aircraft. Alternatively, the obstacle sensor payload 162 may be installed during the fabrication of the aircraft 700 and, therefore, the obstacle sensor payload 162 may be permanently affixed or integrated with the aircraft 700. The one or more propulsors 710 may be positioned, for example, on the fuselage 702 (e.g., a pusher configuration as illustrated), on the wing panels 704, or elsewhere on the aircraft 700. While the aircraft 700 is illustrated as having a single propulsor 710, it should be appreciated that additional propulsors 710 may be provided. For example, one or more propulsors 710 may be provided on each wing panel 704.

Figure 8A:
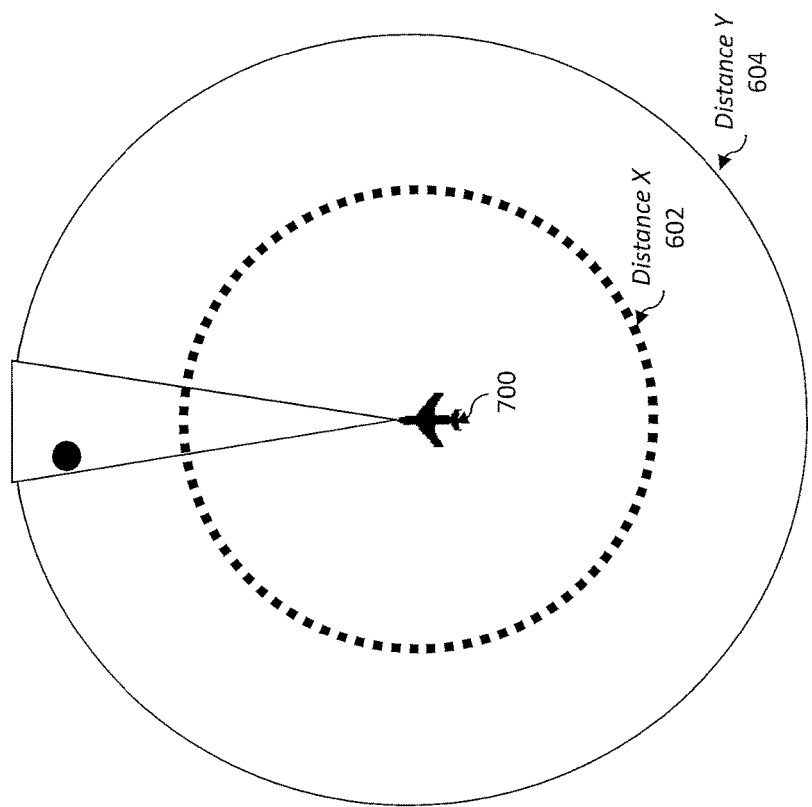
FIGS. 8a through 8c illustrate diagrams of an example hybrid field of view generated by the radar and the infrared camera.
Figure 8B:
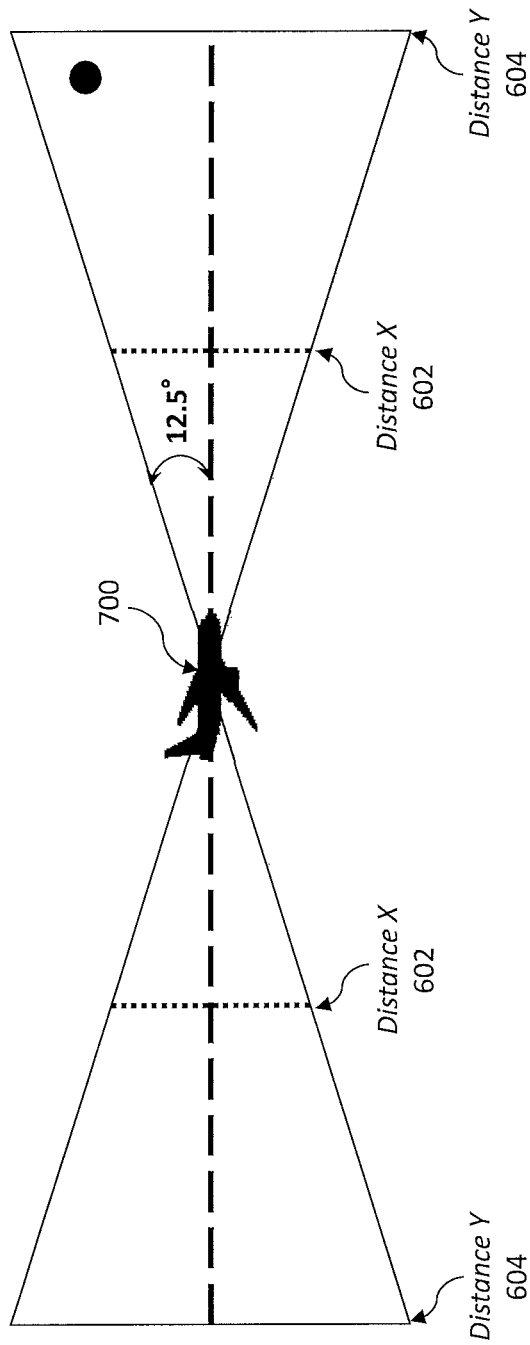
Figure 8C:
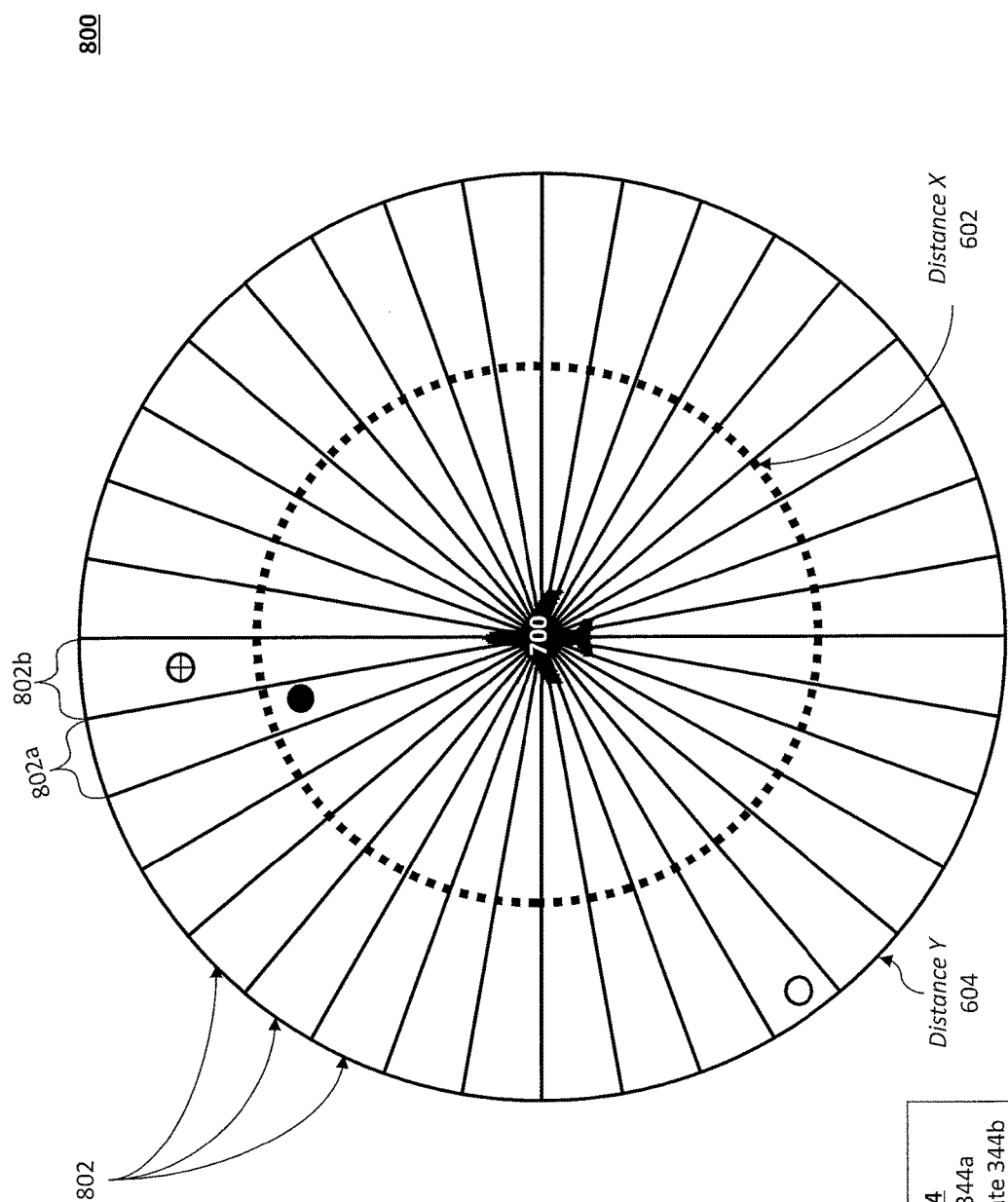

FIGS. 8a through 8c illustrate diagrams of an example hybrid field of view generated by the radar sensor 412 and the infrared camera 414 vis-à-vis the aircraft 700. As illustrated, the obstacle sensor payload's 162 radar sensor 412 and infrared camera 414 may be used in cooperation to more effectively detect and track non-cooperative obstacles 344 within the hybrid field of view. As can be appreciated, the hybrid field of view benefits from both the 360-degree long range scanning ability of the radar sensor 412 and the infrared camera's 414 ability to accurately detect non-cooperative obstacles 344.

FIG. 8a illustrates a top plan view of a two-dimensional (2D) radial map 800 representing the hybrid field of view. In one aspect, the radar sensor 412 may be configured to generate a two-dimensional (2D) radial map 800 of the airspace adjacent the aircraft 700, without azimuthal resolution. The 2D radial map 800 may be a circular airspace about the aircraft 700 (i.e., the aircraft 700 is positioned at the center of the 2D radial map 800). The size of the 2D radial map 800 may be dictated by the range of the radar sensor 412. For example, if the radar sensor 412 has an effective range of 36 miles (distance Y 604=36 miles), the circular airspace about the aircraft may have a radius of 36 miles. In operation, the radar sensor 412 can be configured to identify obstacles 344 within the 2D radial map 800 and, if an obstacle 344 is detected by the radar sensor 412, the infrared camera 414 may be directed to the obstacle 344 to provide higher resolution observation (e.g., image) of the obstacle 344. A processor operatively coupled with the infrared camera 414 may then compare the higher resolution image of the obstacle 344 to a known database of shapes/images (e.g., a look-up table). For example, particularly in the case of surveillance, a database of shapes/images may assist in classifying the type and/or threat level of obstacle 344. Such a technique may also be used in weighing object threat levels where multiple obstacles 344 are detected to determine, if required, which is more dangerous and should be prioritized and avoided/countered (e.g., bird would be less dangerous than an aircraft).

FIG. 8b illustrates a side view of the hybrid field of view. If the radar sensor 412 detects an obstacle 344 within the radius of the 2D radial map 800, the infrared camera 414 may be aimed in the direction of the obstacle 344 to provide higher resolution monitoring once the obstacle 344 is within range of the infrared camera 414 (e.g., within distance X 602, which may be the effective range of the infrared camera 414). As illustrated in FIG. 8b, the infrared camera 414 may tilt up and down to determine and track the azimuthal location of the obstacle 344 (e.g., within the vertical field of view). For example, if the infrared camera 414 offers a 25° azimuthal field of view, the infrared camera 414 may tilt up 12.5° and down 12.5° (relative to the line of flight).

FIG. 8c illustrates a top plan view of the 2D radial map 800 segmented into a plurality of radial sectors 802. To localize an obstacle 344 within the air space of the hybrid field of view, the 2D radial map 800 may be divided into a predetermined number of radial sectors 802 (i.e., N radial sectors). For example, each radial sector 802 may be represented as two straight sides (i.e., being same length as the radius of the circular 2D radial map) and a straight (or curved) edge. The predetermined number of radial sectors 802 may be dictated by, for example, an operating parameter of a sensor of the obstacle sensor payload 162 (e.g., the infrared camera 414). For example, in the above example, the infrared camera 414 provides a 12° field of view in the horizontal direction and, therefore, the 360° may be divided into 30 radial sectors (i.e., N=360°/horizontal field of view=360°/12°=30). Therefore, the infrared camera 414 may be configured to pan between N positions within the 360-degree 2D radial map 800. More specifically, the infrared camera 414 need only scan a specified radial sector 802 to determine the precise azimuthal location of the obstacle 344.

As explained above, the radar sensor 412 offers excellent range, and therefore is able to more quickly identify distant obstacles 344 within the 2D radial map 800. The infrared camera 414, however, offers greater accuracy and resolution, but has a more limited range and field of view. Therefore, the radar sensor 412 may be used to locate an obstacle 344 within a radial sector 802 of the 2D radial map 800 and to direct the infrared camera 414 to the radial sector 802 where the obstacle 344 is located. For example, if the radar sensor 412 detects an imminent threat obstacle 344*a* within a first radial sector 802*a* (e.g., within the first predetermined distance 342*a*), the infrared camera 414 may be panned from its current location to the first radial sector 802*a* to perform further analysis and observation of the imminent threat obstacle 344*a*. Likewise, given the extended range afforded by the radar sensor 412, the radar sensor 412 may detect an intermediate threat obstacle 344*b* that may be outside the effective range of the infrared camera 414 (e.g., between the second predetermined distance 342*a* and second predetermined distance 342*b*). For example, if an intermediate threat obstacle 344*b* is detected within a second radial sector 802*b*, the infrared camera 414 may be panned from its current location to the second radial sector 802*b* to perform further analysis and observation of the intermediate threat obstacle 344*b* once the intermediate threat obstacle 344*b* is within the effective range of the infrared camera 414.

Between the radar data from the radar sensor 412 and the camera data from the infrared camera 414, the obstacle sensor payload 162 can provide data reflecting, inter alia, the current position (in three-dimensions), trajectory, and physical characteristics (e.g., size and shape) of each obstacle 344. In addition, the obstacle sensor payload 162 may determine an identification (e.g., a tail number, if known), status (e.g., cooperative or non-cooperative), etc. The location and various operational conditions for each obstacle 344 may then be communicated to the core platform 102 and/or flight control system 116 for appropriate action by the pilot or the aircrew automation system 100. As discussed above with reference to FIGS. 3*c* through 3*e*, the obstacle sensor payload 162 and any obstacles 344 may be monitored by the human machine interface 104 via the sensor payload monitoring application 336. The sensor payload monitoring application 336 may be configured to access all information collected by the radar sensor 412 and infrared camera 414, as well as monitor the health of said sensors. The sensor payload monitoring application 336 may also be configured to track air traffic and generate predicted future paths to be displayed to the pilot. For example, based on the various radial-azimuthal-distance obstacle measurements, the route manger 160 may generate an obstacle-avoidance navigational route to avoid the one or more obstacles detected by the obstacle sensor payload 162. The sensor payload monitoring application 336 may also be configured to prompt the pilot to select a generated obstacle-avoidance navigational route to be performed by the flight control system 116.

Knowledge Acquisition System 114.

The knowledge acquisition system 114 gathers and/or generates a knowledge base necessary to enable the aircrew automation system 100 to determine aircraft specific information. This includes knowledge of aircraft performance characteristics, limitations, checklists, procedures (including emergency procedures), and criteria that define contingencies in the aircraft. The data may be derived from a combination of encoded data (e.g., from manuals, pilot briefings, pilot operating handbook) and data acquired in flight (e.g., via sensors), which supports off-line machine-learning and trend analysis. The data to be encoded may be loaded in .xml (or .xmlx) format that describes the contents of procedures and the flow of tasks both within and between procedures.

As illustrated in FIG. 1*b*, for example, the knowledge acquisition system 114 may receive operational commands from the core platform 102, while sending to the core platform 102 configuration data and status and response information generated by the knowledge acquisition system 114. The operation of the knowledge acquisition system 114 may be generally divided into three processes, including, for example, aircraft system modeling, procedure codification, and aerodynamic modeling. The aircraft system modeling process provides the aircrew automation system 100 with information about the available onboard systems and how the onboard systems are configured, actuation limits, etc. The procedure codification process provides the aircrew automation system 100 with information about aircraft operation in normal and non-normal situations. Procedure codification may include, for example, the codification of checklists. Finally, aerodynamic modeling process provides the aircrew automation system 100 with information about flying the aircraft and what performance to expect for a given aircraft type and configuration.

During the knowledge acquisition phase, the conditions under which a situation is considered an anomaly or contingency must also be established. These conditions will frequently be discrete, such as an engine over-speed or the exceedance of an airspeed limit. Using machine-learning, the aircrew automation system 100 can fine-tune its aerodynamic and control models by observing a series of in-flight maneuvers flown by the pilot. This information includes flight dynamics data, operational limitations, procedures, aircraft systems, and layouts as well as other related data. In addition to written information, the aircrew automation system 100 may also codify information based on past events and experience of more experienced pilots. Machine-learning enables the knowledge acquisition process to be performed efficiently and quickly.

Using aircrew automation system's 100 perception system 106 and actuation system 108, the instruments and controls in a plane cockpit or a realistic simulator are monitored as a pilot goes through the motions of a typical flight profile. Observing the pilot's actions allows the aircrew automation system 100 to learn directly from the pilot and imitate the smooth, expert control for a given operation. This process benefits from the fact that flight operations are highly structured in what is to be done in a given situation—machine-learning then enables the codification of how something is to be executed.

The population of aircraft data structure 208 may be accomplished using the Extensible Markup Language ("XML"). More specifically, a XML data structure may be employed that comprises a set of fields and data trees that, when populated, allow the core platform 102 to configure and operate an aircraft. In certain aspects, the aircrew automation system 100 may employ natural language interpretation of flight documents and/or a software tool that enables a human to enter the data efficiently and accurately.

In certain aspects, a set of airplane agnostic features may be generated and coded. For example, procedures like landing gear retraction, engine out procedures on multi-engine aircraft, and stall recovery are similar across many types of aircraft and will need only minimal modification for a particular airframe. Moreover, basic airframe limitations (such as never exceed speeds) need only be entered as specific numbers and can be entered from flight manuals in a nominal period of time.

Procedure Editor.

The aircraft specific information may be gathered during a transition period using, for instance, written documentation (e.g., pilot operating handbook, maintenance manual, etc.) as well as through direct monitoring of aircraft operations. The output of this knowledge acquisition process is the aircraft data structure 208, which is described above with regard to the core platform 102. Contained in this aircraft data structure 208 may be operational procedures, available systems and their designs, cockpit layout, and all other information necessary for safe operation of the aircraft. In certain aspects, an aircrew automation software development kit may allow a software/flight controls engineer to specify, code, and unit-test one aircraft subsystem (e.g., electrical or hydraulic) per day. The aircrew automation software development kit can provide tools for turning the flight manual's procedures into state machines compatible with Matlab State Flow and Simulink, which can then auto-code the procedures in C language for inclusion in the core platform 102. The aircrew automation software development kit may also generate test code for the unit-level as well as interfaces for testing to the core platform 102. For example, the procedure editor may provide a list of tasks where the pilot may select whether the aircrew automation system 100 or the pilot is responsible for a given task on the list.

Knowledge Acquisition of Flight Control.

A first step in knowledge acquisition of flight control uses the Athena Vortex Lattice ("AVL") method to generate the mathematical model in the form of non-dimensional stability derivatives that are used and refined during the flight with the pilot. Once the primary flight control mechanisms are calibrated, the system ID trainer application may be used to perform a sequence of flight maneuvers designed to identify specific stability derivatives. The data is automatically processed into updated stability derivatives for use in the controller. The controller may employ an auto-tuner. The same updated stability derivatives are used in a 6-DOF simulation as a validation step that the controllers perform adequately prior to flight. An additional benefit of performing knowledge acquisition of flight control is that it enables the refinement and incorporation of a great deal of formal procedural knowledge. Although the procedures lay out the individual steps, fine detail on how such steps are to be executed may be missing (e.g., how long to wait between steps or how sharply to increase throttle).

Reverse Engineer of Aircraft Flight Performance Characteristics.

Aircraft performance characteristics that can be measured through on-board data-acquisition units are generally considered proprietary by the aircraft and avionic manufacturers. This information can be utilized for flight simulations, aircraft health monitoring, aircraft development, and much more. Currently, third parties wanting to utilize the on-board data acquisition are restricted by its proprietary nature. This restriction has only been partially been overcome using stand-alone aircraft sensor suites. These commercially available sensor suites only measure a fraction of the data available through cockpit instrumentation and pilot inputs. However, because the aircrew automation system 100 utilizes a variety of sensors to determine the aircraft flight performance characteristics, it effectively reverse engineers the air vehicle performance characteristics. The aircrew automation system 100 collects aircraft information through a combination of stand-alone sensors, data capture through images of cockpit instrument, and input controls.

Example

Aspects of the present disclosure may be illustrated through the following example flight plan, which illustrates how aircrew automation system 100 may interact with the pilot, execute a flight plan, execute flight operational tasks, respond to contingencies during system engagement and takeoff, flight plan engagement, and anomaly detection & handling. The present teachings, however, should not be limited to those used in this example.

System Engagement and Takeoff.

The pilot gets into the left seat of an aircraft, fastens the seat belt, positions the human-machine interface 126 comfortably at his side, and activates the aircrew automation system 100 application. The application boots and runs through a series of power-on diagnostics and the mechanical interfaces power up and calibrate. A message may be displayed upon the human-machine interface 126 confirming a successful test and queries the pilot to confirm engagement of aircrew automation system 100. The pilot selects the day's flight plan via the applications tab 334. The aircrew automation system 100 may be used for checklist monitoring. The pilot selects engine start, and aircrew automation system 100 may begin a sequence of engine start actions, asking for final confirmation before actually starting. Meanwhile, the pilot may call the tower for clearance and receives a flight plan to the training area.

When engine start is complete, the aircrew automation system 100 may report success to the pilot and report, for example, "ready to taxi," (either audibly or via the human-machine interface 126). The pilot calls for a taxi clearance and upon hearing it, the aircrew automation system 100 transcribes the taxi clearance and displays it to the pilot for confirmation. The pilot then hits the "taxi via clearance" button on the application and aircrew automation system 100 taxis to the assigned runway while the pilot monitors for traffic. When at the runway threshold, the pilot verbally commands the aircrew automation system 100 to perform a pre-takeoff check (via the checklist) and the system completes all necessary checks, prompting the pilot to manually double-check critical items, such as flight controls. For example, the aircrew automation system 100 may monitor the human operator's execution of a checklist, and output "checklist complete" or identify a flight plan or error.

Upon receiving further clearance, the pilot then commands the aircrew automation system 100 to guide the aircraft to line-up, wait, and then ultimately takeoff. The aircrew automation system 100 pushes the throttles forward via the primary actuation system 108a, visually checks engine and cockpit indicators via the perception system 106, calls out speeds via the HMI system 104, and rotates at the speed appropriate to the current weight, balance, and density altitude. The pilot keeps his hand on the stick/yoke 514 to confirm aircrew automation system's 100 inputs and retain his muscle memory. The aircrew automation system 100 confirms aircraft performance according to current conditions and reports any deviation from expected climb rate. The pilot's workload is reduced by the aircrew automation system 100 during climb, enabling more heads-up time (i.e., eyes forward, not on the instruments) to look for traffic in the busy airspace. The aircrew automation system 100 may also provide experienced pilot advice for a given checklist, aircraft, or location. For example, in a particular airport, the aircrew automation system 100 may instruct the human operator with airport specific tips, such as "steep departure angle from this runway."

Flight Plan Engagement.

At the top of climb, the aircrew automation system 100 levels off the aircraft and adjusts trim and power settings while heading to the first waypoint in the flight plan. During cruise, the aircrew automation system 100 continues to visually monitor all cockpit displays, constantly comparing engine and aircraft performance against expected values and alerting the pilot to any deviations.

The aircraft arrives at the training area and begins the day's flight plan. During the flight plan, however, the aircraft enters a towering cumulus cloud, where instrument meteorological conditions ("IMC") conditions are at below freezing temperatures. The pilot requests and receives clearance from the ground, via an internet relay chat ("IRC") chat window on the human-machine interface 126, to climb to 24,000 feet to get above the weather. In certain aspects, the aircrew automation system 100 request clearance from the ground.

Anomaly Detection & Handling.

After a period of time, the aircrew automation system 100 may detect that given the climb, the indicated airspeed is slowly deviating from its modeled airspeed for these pitch and power settings, indicating lower than expected values. This is an indication that the pitot heater has failed and the pitot tubes have iced up. The pilot has fewer than 100 hours flying the aircraft and is not aware that pitot heaters in this model are known to be unreliable. The pilot has not yet noticed that the airspeed indicator is trending below nominal.

The aircrew automation system 100, however, recognizes that the airspeed data is anomalous to the rest of the flight data and its internal flight dynamics model, and aurally warns the pilot "airspeed indicator fault." While the pilot recognizes that the airspeed information is currently unreliable, he is unsure as to whether the aircraft is flying faster or slower than the indicator shows.

Drawing on a database of prior anomalies, the aircrew automation system 100 presents a set of procedural options and highlights the minimum safe altitude for the area (e.g., 8,000 ft). The pilot chooses the most conservative option, which results in wings level, pitch, and power descent to a lower altitude (e.g., 10,000 ft). The aircrew automation system 100 eases back on the power, pitches slightly down, and commences the descent. While descending through 15,000 feet the pitot tubes again come online. Once stable at 10,000 feet, the aircrew automation system 100 holds the aircraft straight and level while the pilot assesses the situation prior to returning to the flight plan.

Upon competition of the day's flight plan, the aircrew automation system 100 may execute an automatic landing procedure. For example, the aircrew automation system 100 may navigate the aircraft to a predetermined waypoint, where the aircraft may commence its initial descent. During the descent, the aircrew automation system 100 may monitor the flight conditions and locate the runway. Upon final approach, the aircrew automation system 100 may slow the aircraft down and ultimately land the aircraft. If the aircrew automation system 100 determines that landing is not feasible (e.g., an obstruction or unacceptable flight conditions), the aircrew automation system 100 may commence a missed approach routine or other contingency routine. For example, the aircrew automation system 100 may retry landing at the same location or navigate the aircraft to an alternative landing location. An example system for landing an aircraft at an alternative landing location is disclosed by commonly owned U.S. Patent Publication No. 2015/0323932, titled "Autonomous Cargo Delivery System."

The aircrew automation system 100 and derivative technologies may be applied across a wide range of aircraft and flight simulators. The derived flight performance characteristics from an aircraft flight test can be used to improve the fidelity of flight simulators used to train pilots. Providing flight simulators access to actual aircraft performance data has tremendous value for flight simulator operators. Another benefit of aircrew automation system 100 is its ability to synthesize flight performance characteristics when aircraft are modified for special flight plans such as the addition of sensors and antennas that can affect aerodynamic performance and flight handling qualities (e.g., aircraft development). In addition, the data captured by the aircrew automation system 100 can be used for aircraft health monitoring, using prognostics to sense maintenance needs.

The aircrew automation system 100 furthers the safety and utility of commercial aviation operations while providing significant savings in human operating costs. For example, the aircrew automation system 100 may be applied to long-haul air cargo carriers to increase safety and efficiency as well the cost-savings of this advanced pilot-assist technology. Further, the ultimate state machine, for example, may serve as a training tool for pilots in-flight, or as a safety system, providing a second set of eyes in what would traditionally be a single-pilot aircraft. Portions of the human-machine interface 126 streamline all piloted flight operations, even multi-crew operations.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. An obstacle detection system for use in an aircraft, the obstacle detection system comprising:
    a sensor payload to detect a non-cooperative obstacle within a first airspace that is adjacent the aircraft, the sensor payload comprising
        a radar to radially scan the first airspace at a first resolution to generate radar information, and
        a camera to image the non-cooperative obstacle in a second airspace within said first airspace at a second resolution to generate optical information, wherein the second resolution is higher than the first resolution; and
    a processor operatively coupled with the sensor payload, wherein the processor is configured to
        determine, using the radar information, a location of the non-cooperative obstacle in the first airspace,
        direct the camera toward the location of the non-cooperative obstacle using the radar information, and
        process the optical information of the non-cooperative obstacle to identify features of the non-cooperative obstacle.

2. The obstacle detection system of claim 1, wherein the processor is configured to assign a threat level to the non-cooperative obstacle as a function of the optical information.

3. The obstacle detection system of claim 1, wherein the processor calculates a scan angle using the location of the non-cooperative obstacle and pans the camera in accordance with the scan angle to image the non-cooperative obstacle.

4. The obstacle detection system of claim 1, wherein the camera includes a visible-near infrared electro-optic (EO) sensor or a long wave infrared sensor.

5. The obstacle detection system of claim 1, wherein the optical information includes at least one of a thermal cross section and an optical cross section and the radar information comprises a radar cross section, wherein the processor in configured to combine the optical cross section and the radar cross section to identify the non-cooperative obstacle.

6. The obstacle detection system of claim 1, wherein the radar information includes a two-dimensional (2D) location of the non-cooperative obstacle within the first airspace, and the optical information includes an azimuthal location of the non-cooperative obstacle within the second airspace.

7. The obstacle detection system of claim 1, wherein the processor is configured to generate a predicted flight path for the non-cooperative obstacle based at least in part on the radar information and the optical information.

8. The obstacle detection system of claim 7, wherein the processor is configured to generate an obstacle-avoidance navigational route to avoid a collision with the non-cooperative obstacle based at least in part on the predicted flight path.

9. The obstacle detection system of claim 8, further comprising a human-machine interface operatively coupled with the processor to enable a human pilot to monitor the obstacle-avoidance navigational route.

10. The obstacle detection system of claim 1, wherein the first airspace provides a 360-degree field of view about the aircraft.

11. The obstacle detection system of claim 10, wherein the 360-degree field of view resides in a plane that is parallel to a line of flight defined by the aircraft.

12. A method for detecting and avoiding a non-cooperative obstacle during operation of an aircraft, the method comprising:
scanning a first airspace using a radar system to generate radar information having a first resolution;
determining a location of the non-cooperative obstacle in the first airspace using the radar information;
directing a camera toward the location of the non-cooperative obstacle using the radar information;
imaging the non-cooperative obstacle in a second airspace using the camera to generate optical information at a second resolution that is higher than the first resolution, wherein the second airspace is within said first airspace;
tracking the non-cooperative obstacle based at least in part on the radar information and the optical information;
generating a predicted flight path based at least in part on the radar information and the optical information;
generating an obstacle-avoidance navigational route to avoid the non-cooperative obstacle; and
communicating the obstacle-avoidance navigational route to a flight control system of the aircraft.

13. The method of claim 12, wherein the aircraft is configured to execute autonomously the obstacle-avoidance navigational route.

14. The method of claim 12, wherein the camera includes a long wave infrared sensor configured to pan and tilt.

15. The method of claim 12, further comprising the step of determining an azimuthal location of the non-cooperative obstacle within the second airspace using the camera.

16. The method of claim 12, wherein the radar system is a mechanically rotating marine radar.

17. The method of claim 16, wherein the radar information includes a two-dimensional (2D) radial map of the first airspace.

18. The method of claim 12, further comprising the step of generating, via the processor, a predicted flight path for the non-cooperative obstacle based at least in part on the data received from the sensor payload.

19. A sensor payload for an aircraft to detect a non-cooperative obstacle within an airspace adjacent the aircraft, the sensor payload comprising:
a radar to radially scan the airspace to provide a location of the non-cooperative obstacle;
a first sensor to detect a thermal signature of the non-cooperative obstacle at the location;
a second sensor to image the non-cooperative obstacle at the location; and
a processor operatively coupled with each of the radar, the first sensor, and the second sensor, wherein the processor is configured to determine the location of the non-cooperative obstacle using data from the radar, to direct at least one of the first sensor and the second sensor toward the location of the non-cooperative obstacle, and to classify the non-cooperative obstacle at the location using the thermal signature from the first sensor and the image from the second sensor.

20. The sensor payload of claim 19, wherein the second sensor includes a long wave infrared sensor.

21. The sensor payload of claim 19, wherein the second sensor includes a visible-near infrared electro-optic (EO) sensor.

* * * * *